(12) United States Patent
Xu et al.

(10) Patent No.: US 12,452,751 B2
(45) Date of Patent: Oct. 21, 2025

(54) APPARATUS AND METHOD OF PRUNING NEW RADIO CELLS THAT DO NOT SUPPORT VOICE OVER NEW RADIO FROM A MEASUREMENT REPORT

(71) Applicant: INNOPEAK TECHNOLOGY, INC., Palo Alto, CA (US)

(72) Inventors: Xin Xu, Palo Alto, CA (US); Yongsheng Shi, Palo Alto, CA (US); Jaehyeuk Yang, Palo Alto, CA (US)

(73) Assignee: INNOPEAK TECHNOLOGY, INC., Palo Alto, CA (US)

( * ) Notice: Subject to any disclaimer, the term of this patent is extended or adjusted under 35 U.S.C. 154(b) by 344 days.

(21) Appl. No.: 18/188,218

(22) Filed: Mar. 22, 2023

(65) Prior Publication Data
US 2023/0224768 A1    Jul. 13, 2023

Related U.S. Application Data

(63) Continuation of application No. PCT/US2021/037645, filed on Jun. 16, 2021.

(60) Provisional application No. 63/082,252, filed on Sep. 23, 2020.

(51) Int. Cl.
H04W 36/00 (2009.01)
H04W 36/24 (2009.01)

(52) U.S. Cl.
CPC . *H04W 36/0085* (2018.08); *H04W 36/00226* (2023.05); *H04W 36/24* (2013.01); *H04W 36/008357* (2023.05)

(58) Field of Classification Search
CPC ....... H04W 36/0085; H04W 36/00226; H04W 36/24; H04W 36/008357

USPC .......................................... 370/331
See application file for complete search history.

(56) References Cited

U.S. PATENT DOCUMENTS

| 8,411,555 | B2 * | 4/2013 | Kazmi | H04W 36/144 |
|---|---|---|---|---|
| | | | | 370/252 |
| 11,115,877 | B2 * | 9/2021 | Rahman | H04W 36/305 |
| 2013/0142169 | A1 | 6/2013 | Kulakov et al. | |
| 2017/0201911 | A1 | 7/2017 | Ng et al. | |
| 2017/0215116 | A1 | 7/2017 | Siravuru et al. | |
| 2018/0007588 | A1 | 1/2018 | Lin | |

(Continued)

FOREIGN PATENT DOCUMENTS

| CN | 109905899 | 6/2019 |
|---|---|---|
| CN | 110691390 | 1/2020 |

(Continued)

OTHER PUBLICATIONS

Chiang et al, U.S. Appl. No. 63/036,381 Specification, Jun. 8, 2020, all pages (Year: 2020).*

(Continued)

*Primary Examiner* — Anthony Mejia
(74) *Attorney, Agent, or Firm* — Hodgson Russ LLP

(57) ABSTRACT

An apparatus for wireless communication of a UE is disclosed. The apparatus may initiate, at a new radio (NR) serving cell, a voice session with an IMS. The apparatus may perform, in response to determining that voice over NR (VoNR) is not supported by the first NR cell, an EPS fallback procedure to establish the voice session with the IMS. The apparatus may update a whitelist of NR cells that support VoNR to include the first NR cell when it is determined that the first NR cell supports VoNR.

20 Claims, 14 Drawing Sheets

(56) References Cited

U.S. PATENT DOCUMENTS

| | | | |
|---|---|---|---|
| 2018/0092085 A1 | 3/2018 | Shaheen et al. | |
| 2019/0281506 A1* | 9/2019 | Chiang | H04L 65/1069 |
| 2019/0281647 A1* | 9/2019 | Chiang | H04L 65/1069 |
| 2020/0112892 A1* | 4/2020 | Shi | H04W 36/0079 |
| 2020/0275259 A1* | 8/2020 | Zhu | H04L 65/1095 |
| 2021/0385735 A1* | 12/2021 | Chin | H04W 36/00224 |

FOREIGN PATENT DOCUMENTS

| | | |
|---|---|---|
| WO | 2008023162 A2 | 2/2008 |
| WO | 2009001269 | 12/2008 |

OTHER PUBLICATIONS

WIPO, International Search Report and Written Opinion for PCT/US2021/037645, Nov. 4, 2021.
WIPO, International Search Report and Written Opinion for PCT/CN2021/119653, Dec. 21, 2021.
Ericsson, "Return from UTRAN to NG-RAN for SRVCC from 5GS to UTRAN," 3GPP TSG RAN WG6#9, R6-180146, Aug. 2018.
Samsung, "CR on UE behavior with E-UTRA cell selection upon mobility from NR failure for enhanced EPS voice fallback," 3GPP TSG-RAN WG2 Meeting #111-e, R2-2008007, Aug. 2020.
Samsung, "CR on UE behavior with E-UTRA cell selection upon mobility from NR failure for enhanced EPS voice fallback," 3GPP TSG-RAN WG2 Meeting #111-e, R2-2008525, Aug. 2020.
EPO, Search Report for EP Application No. 21873121.4, Feb. 26, 2024.
CNIPA, First Office Action for CN Application No. 202180065400.9, Jun. 27, 2025.

* cited by examiner

APPARATUS AND METHOD OF PRUNING NEW RADIO CELLS THAT DO NOT SUPPORT VOICE OVER NEW RADIO FROM A MEASUREMENT REPORT

CROSS-REFERENCE TO RELATED APPLICATION(S)

This application is a continuation of International Application No. PCT/US2021/037645 filed on Jun. 16, 2021, which claims priority to U.S. Provisional Application No. 63/082,252, filed on Sep. 23, 2020, the entire disclosures of the above-mentioned applications are incorporated by reference.

BACKGROUND

Embodiments of the present disclosure relate to apparatus and method for wireless communication.

Wireless communication systems are widely deployed to provide various telecommunication services such as telephony, video, data, messaging, and broadcasts. In cellular communication, such as the 4th-generation (4G) Long Term Evolution (LTE) and the 5th-generation (5G) New Radio (NR), the 3rd Generation Partnership Project (3GPP) defines various mechanisms for establishing internet protocol (IP) multimedia subsystem (IMS) voice sessions in a standalone (SA) 5G network.

SUMMARY

Embodiments of apparatus and method for preventing IMS voice session failure with the use of a whitelist of NR cells that support voice over NR (VoNR) are disclosed herein.

According to one aspect of the present disclosure, an apparatus for wireless communication of a UE is disclosed. The apparatus may include a memory and at least one processor coupled to the memory and configured to perform operations associated with wireless communication. For example, the at least one processor may be configured to initiate, at a first NR cell, a voice session with an IMS. The at least one processor may be further configured to perform, in response to determining that voice over NR (VoNR) is not supported by the first NR cell, an EPS fallback procedure to establish the voice session with the IMS. The at least one processor may be further configured to update a whitelist of NR cells that support VoNR to include the first NR cell when it is determined that the first NR cell supports VoNR.

According to one aspect of the present disclosure, a method of wireless communication of a UE is disclosed. The method may include initiating, at a first NR cell, a voice session with an IMS. The method may further include updating, in response to determining that VoNR is supported by the first NR cell, a whitelist of NR cells that support VoNR to include the first NR cell.

According to another aspect of the present disclosure, a non-transitory computer-readable medium encoding instructions that, when executed by at least one processor, perform a process for voice communication of a UE. The process may include initiating, at a first NR cell, a voice session with an IMS. The process may further include determining whether the first NR cell supports VoNR when the voice session with the IMS is initiated. The process may further include performing an EPS fallback procedure to establish the voice session with the IMS when the first NR cell is determined not support VoNR. The process may further include updating a whitelist of NR cells that support VoNR to include the first NR cell when it is determined that the first NR cell supports VoNR.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

Figure 1:
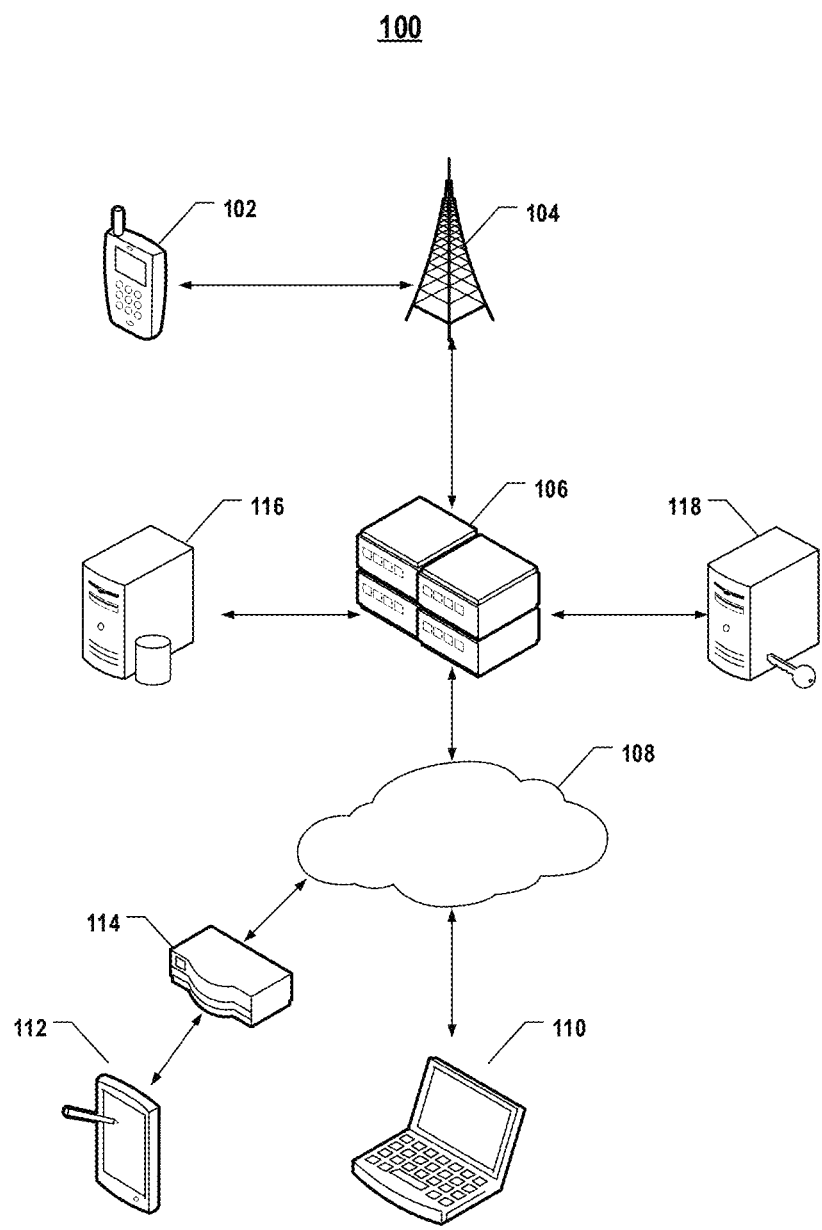
FIG. 1 illustrates an exemplary wireless network, according to some embodiments of the present disclosure.

Embodiments of the present disclosure will be described with reference to the accompanying drawings.

DETAILED DESCRIPTION

Although some configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," "certain embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure, or characteristic is described in connection with an embodiment, it would be within the knowledge of a person skilled in the pertinent art to effect such feature, structure, or characteristic in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Various aspects of wireless communication systems will now be described with reference to various apparatus and methods. These apparatus and methods will be described in the following detailed description and illustrated in the accompanying drawings by various blocks, modules, units, components, circuits, steps, operations, processes, algorithms, etc. (collectively referred to as "elements"). These elements may be implemented using electronic hardware, firmware, computer software, or any combination thereof. Whether such elements are implemented as hardware, firmware, or software depends upon the particular application and design constraints imposed on the overall system.

The techniques described herein may be used for various wireless communication networks, such as code division multiple access (CDMA) system, time division multiple access (TDMA) system, frequency division multiple access (FDMA) system, orthogonal frequency division multiple access (OFDMA) system, single-carrier frequency division multiple access (SC-FDMA) system, wireless local area network (WLAN) system, and other networks. The terms "network" and "system" are often used interchangeably. A CDMA network may implement a radio access technology (RAT), such as Universal Terrestrial Radio Access (UTRA), evolved UTRA (E-UTRA), CDMA 2000,etc. A TDMA network may implement a RAT, such as the Global System for Mobile Communications (GSM). An OFDMA network may implement a RAT, such as LTE or NR. A WLAN system may implement a RAT, such as Wi-Fi. The techniques described herein may be used for the wireless networks and RATs mentioned above, as well as other wireless networks and RATs.

IMS is predominantly used for delivering voice and video-based multimedia services (referred to hereinafter as "voice session") over IP networks such as LTE, Wi-Fi, rich communication service (RCS), etc. to deliver services such as, e.g., voice over LTE (VoLTE), voice over Wi-Fi (Vo-WiFi), and the like. As IMS is access independent, it can also connect to the 5G network as well (via user plane function (UPF)) for delivering services, e.g., such as VoNR. VoNR is a basic call service, which fully utilizes the SA architecture of the 5G network. Like VoLTE, VoNR establishes voice/video communication services (collectively referred to herein as a "voice session") with the IMS. Compared to other call services, VoNR provides significantly lower latency, improved sound, and picture quality, which results in an extremely elevated calling experience. In the nascent stage of 5G network deployment, VoNR may not be available in all service areas, or in instances when a UE is near an NR cell edge, the VoNR quality may be quite low; moreover, certain legacy UEs operating within the 5G network may not have VoNR capabilities.

In instances such as when VoNR is not available, the industry has specified that the 4G voice/video communication architecture be used by NR UEs to establish voice/video communication services with the IMS. For example, when a gNB that does not support VoNR receives an IMS voice session request from a NR UE, the gNB establishes an IMS voice/video communication channel on the NR network, and the UE performs an EPS fallback procedure to the 4G network to establish the IMS voice session (as shown in the EPS fallback procedure data flow 600 of FIG. 6). The EPS fallback procedure of FIG. 6 may also be used for UEs near an NR cell-edge, for legacy UEs without VoNR capabilities, or when there is a lack of NR radio resources available for voice session establishment.

Figure 6:
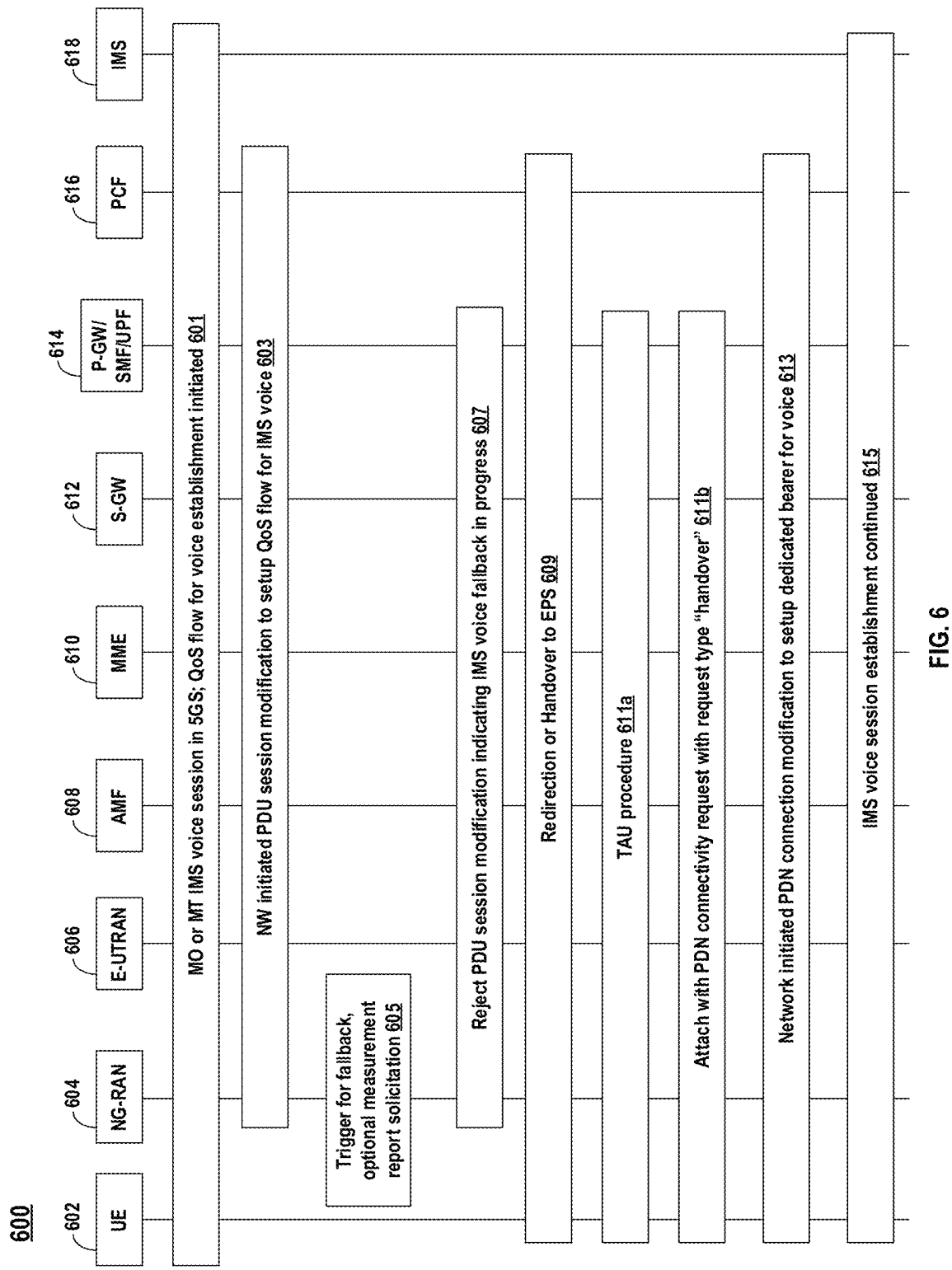
FIG. 6 illustrates a conceptual flow diagram of a data flow of an evolved packet system (EPS) fallback procedure.

FIG. 6 illustrates a data flow 600 of an EPS fallback procedure between core network elements of the 5G and 4G networks. In FIG. 6, the 4G core network elements include, e.g., evolved universal terrestrial access network (E-UTRAN) (the collective evolved node B (eNBs) of the 4G network), a mobility management entity (MME) 610, a serving gateway (S-GW) 612, or a packet data network gateway (P-GW) 614. The 5G core network elements include, e.g., next-generation radio access network (NG-RAN) 604 (the collective g node B (gNBs) of the 5G network), an access and mobility management function (AMF) 608, a session management function (SMF) 614, a user plane function (UPF) 614, and policy control function (PCF) 616. As mentioned above, IMS 618 is access independent and its services may be accessed using the core network elements of either the 4G or 5G networks.

Referring to FIG. 6, at 601, UE 602 resides on NG-RAN 604 and initiates the establishment of the mobile originating (MO) and/or mobile terminating (MT) IMS voice session with its NR serving gNB. At 603, NG-RAN 604 receives the network-initiated packet data unit (PDU) session modification request to set up quality-of-service (QoS) flow for a voice session. At 605, NG-RAN 604 may trigger fallback to EPS when an indication to redirect EPS fallback for voice, network configuration, and/or radio conditions is received from AMF 608. However, when NG-RAN 604 determines (at 605) not to trigger the fallback to EPS, then the procedure stops, and the following steps are not performed. Also, at 605, NG-RAN 604 may initiate measurement report solicitation from UE 602 including E-UTRAN 606 as the handover/fallback target. At 607, NG-RAN 604 may reject the PDU Session modification request (received at 603) with an indication that mobility due to fallback for IMS voice is ongoing. Also, at 607, NG-RAN 604 may indicate the rejection of the PDU session modification to configure QoS flow for IMS voice (received at 603) as PDU session response message toward SMF 614 through AMF 608. This message may include the details on the ongoing mobility due to EPS fallback for IMS voice. SMF 614 may maintain the policy charging control (PCC) rules that are associated with the QoS flows. Based on the UE functionalities, at 609, NG-RAN 604 may initiate handover to EPS. Also, at 609, SMF 614 may report the change of the RAT type, if PCF 616 is so subscribed. A timer may be initiated to track the failure of the EPS fallback procedure. After the timer expires, at 609, SMF 614 may notified PCF 616 of the dedicated bearer creation failure, and new statistics (with the "smf_eps_fb" and "timeout" labels) may be incremented. At 611a, for 5G to EPS handover, UE 602 may initiate a tracking area update (TAU) procedure. At 611b, UE 602 may attach the packet data network (PDN) connectivity request with the "handover" request type. After the completion of the 5GS to EPS handover procedure, at 613, either SMF 614 or P-GW 614 may re-initiate the configuration of the dedicated bearer for IMS voice and map the 5G QoS to EPC QoS parameters. At 613, SMF 614 may notify PCF 616 of the successful resource allocation and access network information, if the PCF 616 is so subscribed. At 615, the IMS voice session establishment/initiation continues on the 4G network.

During the initiation of the IMS voice session via EPS fallback and/or once the IMS voice session has been established, the 4G network may request a measurement report (MR) from UE 602 for a NR first cell and/or a second NR cell. When the MR indicates to the 4G network that channel conditions at the first NR cell or a second NR cell meet certain thresholds, the 4G network may redirect UE 602 back to the 5G network, causing IMS voice session failure for the same reason(s) UE 602 was handed over to the 4G network in the first place; namely, the 5G network does not support VoNR, UE 602 does not have VoNR capabilities, etc. Such voice session failures reduce the quality of the user experience, and increase signaling overhead for both the 4G and 5G networks, as well as drain the battery power of UE 602 unnecessarily. Without a mechanism to prevent such redirections during IMS voice session initiation/establishment, UE 602 may ping pong between the 4G and 5G networks when attempting to establish an IMS voice session.

Thus, there is an unmet need for a technique that prevents inappropriate inter-RAT redirection between the 4G and 5G networks for an IMS voice session established using the EPS fallback procedure described above in connection with FIG. 6.

To overcome these and other challenges, the present disclosure enables the UE to generate/maintain/update a whitelist that indicates which NR cells support VoNR. Using the whitelist, when the UE receives an inter-RAT MR request from the 4G network, the UE may compare the NR cells in the MR to the whitelist and prune any NR cells from the MR that are not on the whitelist prior to sending them to the 4G network. In so doing, the UE may be prevented from redirection back to an NR cell that does not support VoNR, thereby avoiding the associated IMS voice session failure. Additional details of the whitelist of NR cells that support VoNR, and techniques for its use, are described below in connection with FIGS. 1-5.

FIG. 1 illustrates an exemplary wireless network 100, in which some aspects of the present disclosure may be implemented, according to some embodiments of the present disclosure. As shown in FIG. 1, wireless network 100 may include a network of nodes, such as a user equipment 102, an access node 104, and a core network element 106. User equipment 102 may be any terminal device, such as a mobile phone, a desktop computer, a laptop computer, a tablet, a vehicle computer, a gaming console, a printer, a positioning device, a wearable electronic device, a smart sensor, or any other device capable of receiving, processing, and transmitting information, such as any member of a vehicle to everything (V2X) network, a cluster network, a smart grid node, or an Internet-of-Things (IoT) node. It is understood that user equipment 102 is illustrated as a mobile phone simply by way of illustration and not by way of limitation.

Access node 104 may be a device that communicates with user equipment 102, such as a wireless access point, a base station (BS), a Node B, an enhanced Node B (eNodeB or eNB), a next-generation NodeB (gNodeB or gNB), a cluster master node, or the like. Access node 104 may have a wired connection to user equipment 102, a wireless connection to user equipment 102, or any combination thereof. Access node 104 may be connected to user equipment 102 by multiple connections, and user equipment 102 may be connected to other access nodes in addition to access node 104. Access node 104 may also be connected to other user equipments. When configured as a gNB, access node 104 may operate in millimeter wave (mmW) frequencies and/or near mmW frequencies in communication with the user equipment 102. When access node 104 operates in mmW or near mmW frequencies, the access node 104 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW or near mmW radio frequency band have extremely high path loss and a short range. The mmW base station may utilize beamforming with user equipment 102 to compensate for the extremely high path loss and short range. It is understood that access node 104 is illustrated by a radio tower by way of illustration and not by way of limitation.

Access nodes 104, which are collectively referred to as E-UTRAN in the evolved packet core network (EPC) and as NG-RAN in the 5G core network (5GC), interface with the EPC and 5GC through dedicated backhaul links (e.g., S1 interface). In addition to other functions, access node 104 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. Access nodes 104 may communicate directly or indirectly (e.g., through the 5GC) with each other over backhaul links (e.g., X2 interface). The backhaul links may be wired or wireless.

Core network element 106 may serve access node 104 and user equipment 102 to provide core network services. Examples of core network element 106 may include a home subscriber server (HSS), a mobility management entity (MME), a serving gateway (SGW), or a packet data network gateway (PGW). These are examples of core network elements of an evolved packet core (EPC) system, which is a core network for the LTE system. Other core network elements may be used in LTE and in other communication systems. In some embodiments, core network element 106 includes an access and mobility management function (AMF), a session management function (SMF), or a user plane function (UPF), of a 5G core network (5GC) for the NR system. The AMF may be in communication with a Unified Data Management (UDM). The AMF is the control node that processes the signaling between the UEs 102 and the 5GC. Generally, the AMF provides QoS flow and session management. All user Internet protocol (IP) packets are transferred through the UPF. The UPF provides UE IP address allocation as well as other functions. The UPF is connected to the IP Services. The IP Services may include the Internet, an intranet, an IP Multimedia Subsystem (IMS), a PS Streaming Service, and/or other IP services. It is understood that core network element 106 is shown as a set of rack-mounted servers by way of illustration and not by way of limitation.

Core network element 106 may connect with a large network, such as the Internet 108, or another Internet Protocol (IP) network, to communicate packet data over any distance. In this way, data from user equipment 102 may be communicated to other user equipments connected to other access points, including, for example, a computer 110 connected to Internet 108, for example, using a wired connection or a wireless connection, or to a tablet 112 wirelessly connected to Internet 108 via a router 114. Thus, computer 110 and tablet 112 provide additional examples of possible user equipments, and router 114 provides an example of another possible access node.

A generic example of a rack-mounted server is provided as an illustration of core network element 106. However, there may be multiple elements in the core network including database servers, such as a database 116, and security and authentication servers, such as an authentication server 118. Database 116 may, for example, manage data related to user subscription to network services. A home location register (HLR) is an example of a standardized database of subscriber information for a cellular network. Likewise, authentication server 118 may handle authentication of users, sessions, and so on. In the NR system, an authentication server function (AUSF) device may be the entity to perform user equipment authentication. In some embodiments, a single server rack may handle multiple such functions, such that the connections between core network element 106, authentication server 118, and database 116, may be local connections within a single rack.

In order to allow inter-RAT (IRAT) handover between the EPC and 5GC, 4G/5G interworking may be supported by a common subscription data access function (HSS/UDM), combined functions such as PGW-C/SMF, PDN Gateway User Plane (PGW-U)/UPF, and the N26 interface between the MME and the AMF. This enables service continuity and mobility outside of 5G coverage areas, and also enables a smooth migration during the nascent stages of 5G deployment. In certain implementations, access node 104 and core network elements 106 within the 5G network may access the 5GC using control signaling independent of the EPC (and vice versa) and achieve interoperability between 4G and 5G networks through their core networks. 4G/5G interworking mainly includes cell (re)selection in RRC_IDLE state, redirection, and handover in RRC_CONNECTED state. User equipment 102 may camp on the 5G cell (referred to hereinafter as "NR serving cell") and initiate services (such as IMS voice sessions) from the NR serving cell (first NR cell) that may be fulfilled by either the 5G system (5GS), or, in instances when those services are not available at the 5G network (IMS voice, for example), the EPS. Thus, EPS fallback is required to guarantee voice service (by moving user equipment 102 from 5GS to EPS) before IMS-based voice services are connected to 5GC (namely, before VoNR is available at all NR cells) or for one of the various other reasons mentioned above.

Figure 5:
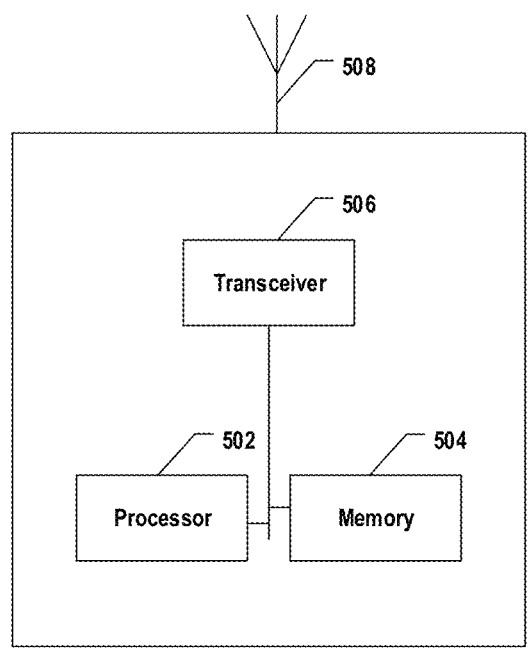
FIG. 5 illustrates a block diagram of an exemplary node, according to some embodiments of the present disclosure.

Each element in FIG. 1 may be considered a node of wireless network 100. More detail regarding the possible implementation of a node is provided by way of example in the description of a node 500 in FIG. 5. Node 500 may be configured as user equipment 102, access node 104, or core network element 106 in FIG. 1. Similarly, node 500 may also be configured as computer 110, router 114, tablet 112, database 116, or authentication server 118 in FIG. 1. As shown in FIG. 5, node 500 may include a processor 502, a memory 504, and a transceiver 506. These components are shown as connected to one another by a bus, but other connection types are also permitted. When node 500 is user equipment 102, additional components may also be included, such as a user interface (UI), sensors, and the like. Similarly, node 500 may be implemented as a blade in a server system when node 500 is configured as core network element 106. Other implementations are also possible.

Transceiver 506 may include any suitable device for sending and/or receiving data. Node 500 may include one or more transceivers, although only one transceiver 506 is shown for simplicity of illustration. An antenna 508 is shown as a possible communication mechanism for node 500. Multiple antennas and/or arrays of antennas may be utilized for receiving multiple spatially multiplex data streams. Additionally, examples of node 500 may communicate using wired techniques rather than (or in addition to) wireless techniques. For example, access node 104 may communicate wirelessly to user equipment 102 and may communicate by a wired connection (for example, by optical or coaxial cable) to core network element 106. Other communication hardware, such as a network interface card (NIC), may be included as well.

As shown in FIG. 5, node 500 may include processor 502. Although only one processor is shown, it is understood that multiple processors can be included. Processor 502 may include microprocessors, microcontroller units (MCUs), digital signal processors (DSPs), application-specific integrated circuits (ASICs), field-programmable gate arrays (FPGAs), programmable logic devices (PLDs), state machines, gated logic, discrete hardware circuits, and other suitable hardware configured to perform the various functions described throughout the present disclosure. Processor 502 may be a hardware device having one or more processing cores. Processor 502 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. Software can include computer instructions written in an interpreted language, a compiled language, or machine code. Other techniques for instructing hardware are also permitted under the broad category of software.

As shown in FIG. 5, node 500 may also include memory 504. Although only one memory is shown, it is understood that multiple memories can be included. Memory 504 can broadly include both memory and storage. For example, memory 504 may include random-access memory (RAM), read-only memory (ROM), static RAM (SRAM), dynamic RAM (DRAM), ferro-electric RAM (FRAM), electrically erasable programmable ROM (EEPROM), compact disc read-only memory (CD-ROM) or other optical disk storage, hard disk drive (HDD), such as magnetic disk storage or other magnetic storage devices, Flash drive, solid-state drive (SSD), or any other medium that can be used to carry or store desired program code in the form of instructions that can be accessed and executed by processor 502. Broadly, memory 504 may be embodied by any computer-readable medium, such as a non-transitory computer-readable medium.

Processor 502, memory 504, and transceiver 506 may be implemented in various forms in node 500 for performing wireless communication functions. In some embodiments, processor 502, memory 504, and transceiver 506 of node 500 are implemented (e.g., integrated) on one or more system-on-chips (SoCs). In one example, processor 502 and memory 504 may be integrated on an application processor (AP) SoC (sometimes known as a "host," referred to herein as a "host chip") that handles application processing in an operating system (OS) environment, including generating raw data to be transmitted. In another example, processor 502 and memory 504 may be integrated on a baseband processor (BP) SoC (sometimes known as a "modem," referred to herein as a "baseband chip") that converts the raw data, e.g., from the host chip, to signals that can be used to modulate the carrier frequency for transmission, and vice versa, which can run a real-time operating system (RTOS).

In still another example, processor 502 and transceiver 506 (and memory 504 in some cases) may be integrated on an RF SoC (sometimes known as a "transceiver," referred to herein as an "RF chip") that transmits and receives RF signals with antenna 508. It is understood that in some examples, some or all of the host chip, baseband chip, and RF chip may be integrated as a single SoC. For example, a baseband chip and an RF chip may be integrated into a single SoC that manages all the radio functions for cellular communication.

Referring back to FIG. 1, in some embodiments, user equipment 102 may be configured to generate and maintain a whitelist of NR cells that support VoNR. Using the whitelist, user equipment 102 may be able to remove any NR cells from a requested measurement report for inter-RAT handover after or during EPS fallback to establish an IMS voice session. In so doing, user equipment 102 may prevent IMS voice session failure that would otherwise occur due to a handover and/or redirection back to an NR cell that does not support VoNR.

Figure 2:
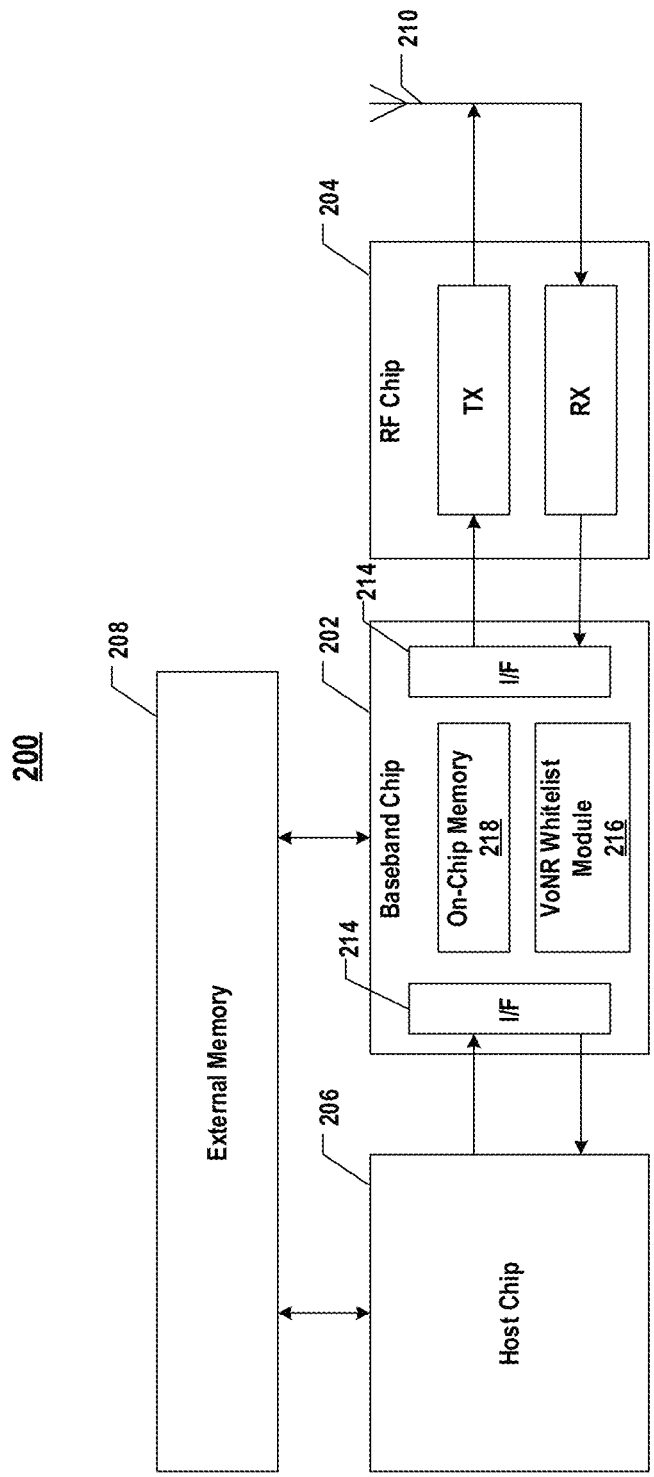
FIG. 2 illustrates a block diagram of an exemplary apparatus including a baseband chip, a radio frequency (RF) chip, and a host chip, according to some embodiments of the present disclosure.

FIG. 2 illustrates a block diagram of an apparatus 200 including a baseband chip 202, an RF chip 204, and a host chip 206, according to some embodiments of the present disclosure. Apparatus 200 may be implemented as user equipment 102 of wireless network 100 in FIG. 1. As shown in FIG. 2, apparatus 200 may include baseband chip 202, RF chip 204, host chip 206, and one or more antennas 210. In some embodiments, baseband chip 202 is implemented by processor 502 and memory 504, and RF chip 204 is implemented by processor 502, memory 504, and transceiver 506, as described above with respect to FIG. 5. Besides the on-chip memory 218 (also known as "internal memory," e.g., registers, buffers, or caches) on each chip 202, 204, or 206, apparatus 200 may further include an external memory 208 (e.g., the system memory or main memory) that can be shared by each chip 202, 204, or 206 through the system/main bus. Although baseband chip 202 is illustrated as a standalone SoC in FIG. 2, it is understood that in one example, baseband chip 202 and RF chip 204 may be integrated as one SoC; in another example, baseband chip 202 and host chip 206 may be integrated as one SoC; in still another example, baseband chip 202, RF chip 204, and host chip 206 may be integrated as one SoC, as described above.

In the uplink, host chip 206 may generate raw data and send it to baseband chip 202 for encoding, modulation, and mapping. Interface 214 of baseband chip 202 may receive the data from host chip 206. Baseband chip 202 may also access the raw data generated by host chip 206 and stored in external memory 208, for example, using the direct memory access (DMA). Baseband chip 202 may first encode (e.g., by source coding and/or channel coding) the raw data and modulate the coded data using any suitable modulation techniques, such as multi-phase shift keying (MPSK) modulation or quadrature amplitude modulation (QAM). Baseband chip 202 may perform any other functions, such as symbol or layer mapping, to convert the raw data into a signal that can be used to modulate the carrier frequency for transmission. In the uplink, baseband chip 202 may send the modulated signal to RF chip 204 via interface 214. RF chip 204, through the transmitter, may convert the modulated signal in the digital form into analog signals, i.e., RF signals, and perform any suitable front-end RF functions, such as filtering, digital pre-distortion, up-conversion, or sample-rate conversion. Antenna 210 (e.g., an antenna array) may transmit the RF signals provided by the transmitter of RF chip 204.

In the downlink, antenna 210 may receive RF signals from an access node or other wireless device. For example, the RF signals may include, among other things, information associated with an EPS fallback procedure to establish an IMS voice session, an inter-RAT MR request (event B1 or event B2 as specified by 3GPP), etc. The RF signals may be passed to the receiver (Rx) of RF chip 204. RF chip 204 may perform any suitable front-end RF functions, such as filtering, IQ imbalance compensation, down-paging conversion, or sample-rate conversion, and convert the RF signals (e.g., transmission) into low-frequency digital signals (baseband signals) that can be processed by baseband chip 202.

As seen in FIG. 2, baseband chip 202 may include VoNR whitelist module 216 configured to generate, maintain, and update a whitelist that indicates which NR cells support VoNR. Each time apparatus 200 identifies an NR serving cell that supports VoNR, the whitelist may be updated to include an indication of that NR cell. The whitelist may also be updated to indicate a number of IMS voice session failures at an NR serving cell that supports VoNR. In certain implementations, when the number of IMS voice session failures reaches a threshold number, apparatus 200 may remove that NR cell from the whitelist. Moreover, when apparatus 200 has an initiated or ongoing IMS voice session established via EPS fallback and an inter-RAT MR request is received, the whitelist may be accessed by apparatus 200, and a determination can be made as to whether the first NR cell/the second NR cell indicated by the MR request is included in the whitelist. When these NR cells are not on the whitelist, the apparatus 200 may remove them from the MR before transmission. In this way, a handover/redirection that would otherwise cause the failure of an IMS voice session established via EPS fallback can be avoided. Additional descriptions for the whitelist, and techniques for its use, are set forth below in connection with FIGS. 3A-3E and 4A-4E.

FIGS. 3A-3E illustrate a data flow 300 between a UE 102, a first gNB 104a (a first NR cell), a second gNB 104b (a second NR cell), an eNB 104c, and IMS 318 that may prevent an inter-RAT handover/redirection that would otherwise cause the failure of an IMS voice session established via EPS fallback, according to certain aspects of the present disclosure. UE 102 may correspond to, e.g., apparatus 200 and/or node 500. First gNB 104a may correspond to, e.g., access node 104 or node 500. Second gNB 104b may correspond to, e.g., access node 104 and/or node 500. eNB 104c may correspond to, e.g., access node 104 and/or node 500. IMS 318 may correspond to, e.g., IMS 618. In FIGS. 3A-3E, optional operations may be indicated with dashed lines.

Figure 3A:
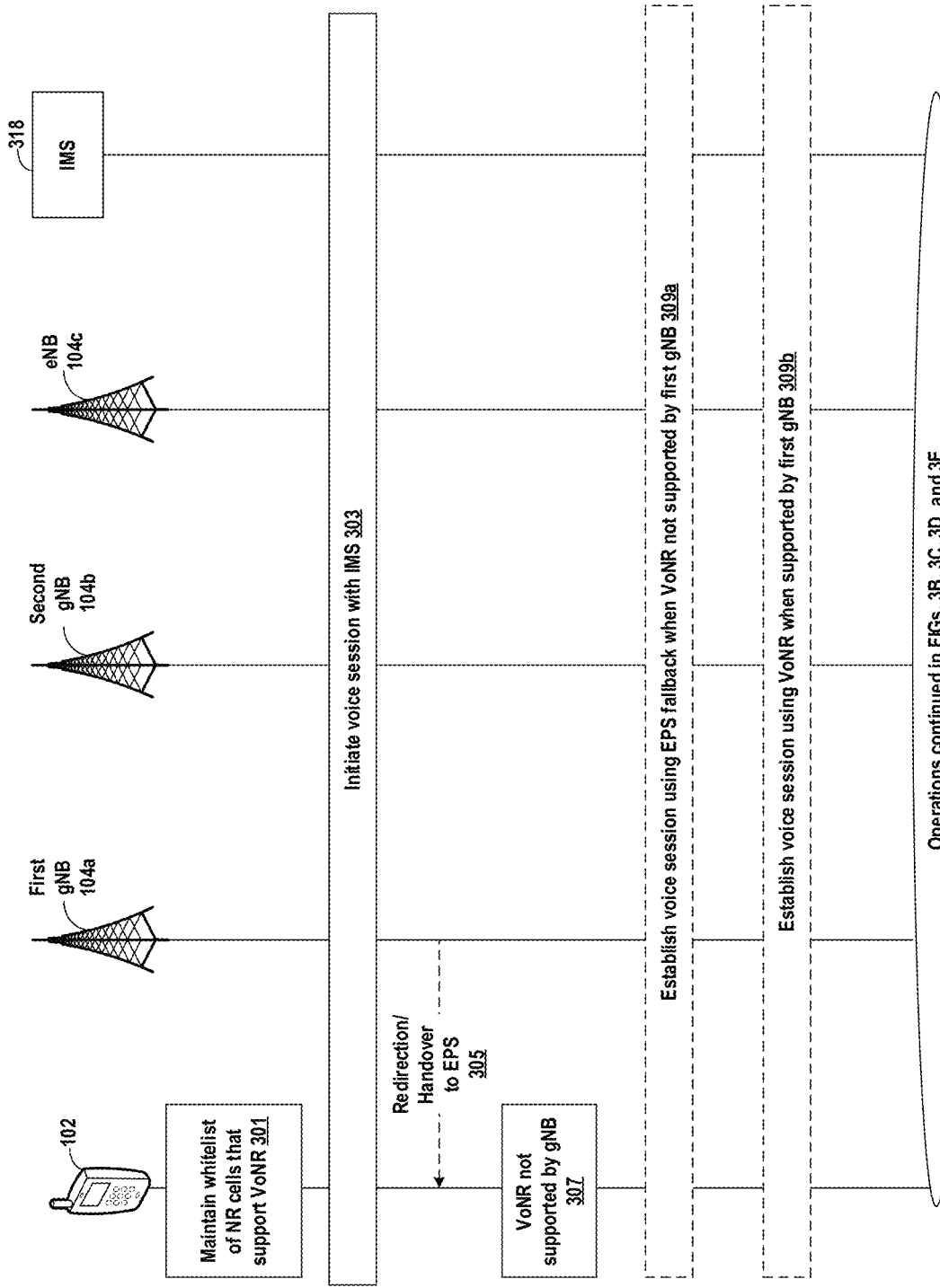
FIGS. 3A-3E illustrate a conceptual flow diagram of the exemplary data flow between a user equipment (UE) configured to generate/maintain a whitelist of NR cells that support VoNR and various other wireless communication devices, according to some embodiments of the present disclosure.

Referring to FIG. 3A, UE 102 may generate/maintain (at 301) a whitelist of NR cells that support VoNR (hereinafter "the whitelist"). By way of example, the whitelist may be maintained at VoNR whitelist module 216 of baseband chip 202 in FIG. 2. UE 102 may be camped on first gNB 104a and initiate (at 303) an IMS voice session. The IMS voice session may be initiated (at 303) using, e.g., operations 601-607 described above in connection with FIG. 6. When VoNR is not supported by first gNB 104a, first gNB 104a may send (at 305) redirection/handover instructions to UE 102 for EPS fallback. Based on the redirection/handover instructions, UE 102 may determine (at 307) that first gNB 104a does not support VoNR. Then, UE 102 may perform (at 309a) EPS fallback to establish a voice session with IMS 318 via eNB 104c. For example, the EPS fallback procedure performed (at 309a) by UE 102 may include, e.g., operations 609-615 described above in connection with FIG. 6. Otherwise, when first gNB 104a supports VoNR, a voice session with IMS 318 may be established (at 309b) using VoNR via first gNB 104a. Here, UE 102 may generate and/or update the whitelist to include an indication that first gNB 104*a* supports VoNR if it is not already on the whitelist.

Figure 3B:
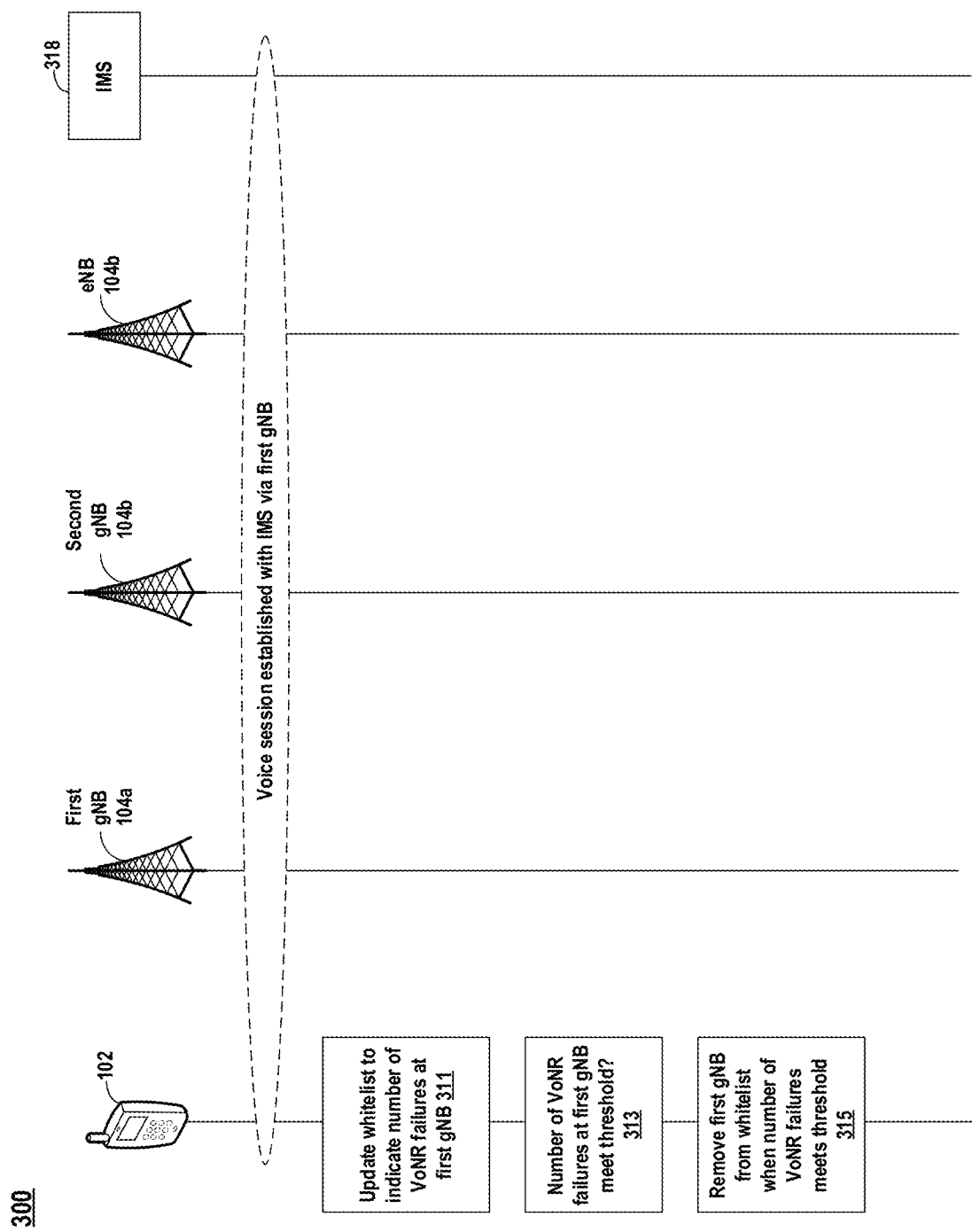

Referring to FIG. 3B, the operations depicted in this illustration may be performed in response to the failure of an IMS voice session initiated and/or established using VoNR at first gNB 104*a*. In other words, the operations of FIG. 3B may be performed in response to a VoNR call drop. In this use case, the whitelist would include an indication that first gNB 104*a* supports VoNR. When UE 102 determines an IMS voice session initiating/established using VoNR at first gNB 104*a* is dropped, UE 102 may update (at 311) the whitelist to indicate VoNR call failure at first gNB 104*a*. For example, UE 102 may update (at 311) the whitelist maintained at VoNR whitelist module 216 of baseband chip 202.

Still referring to FIG. 3B, once the whitelist has been updated, UE 102 may determine (at 313) whether the number of IMS voice session failures associated with first gNB 104*a* meets a threshold number. When it is determined (at 313) that the number of VoNR voice session failures meets the threshold number, UE 102 may remove (at 315) first gNB 104*a* from the whitelist. Then, UE 102 may reestablish the IMS voice session directly with eNB 104*c*. By removing, first gNB 104*a* from the whitelist, if handover/redirection occurs during a subsequent IMS voice session established using EPS fallback, the UE 102 may avoid the failure of an IMS voice session established via EPS fallback for the reasons described below in connection with FIGS. 3C and 3D.

Figure 3C:
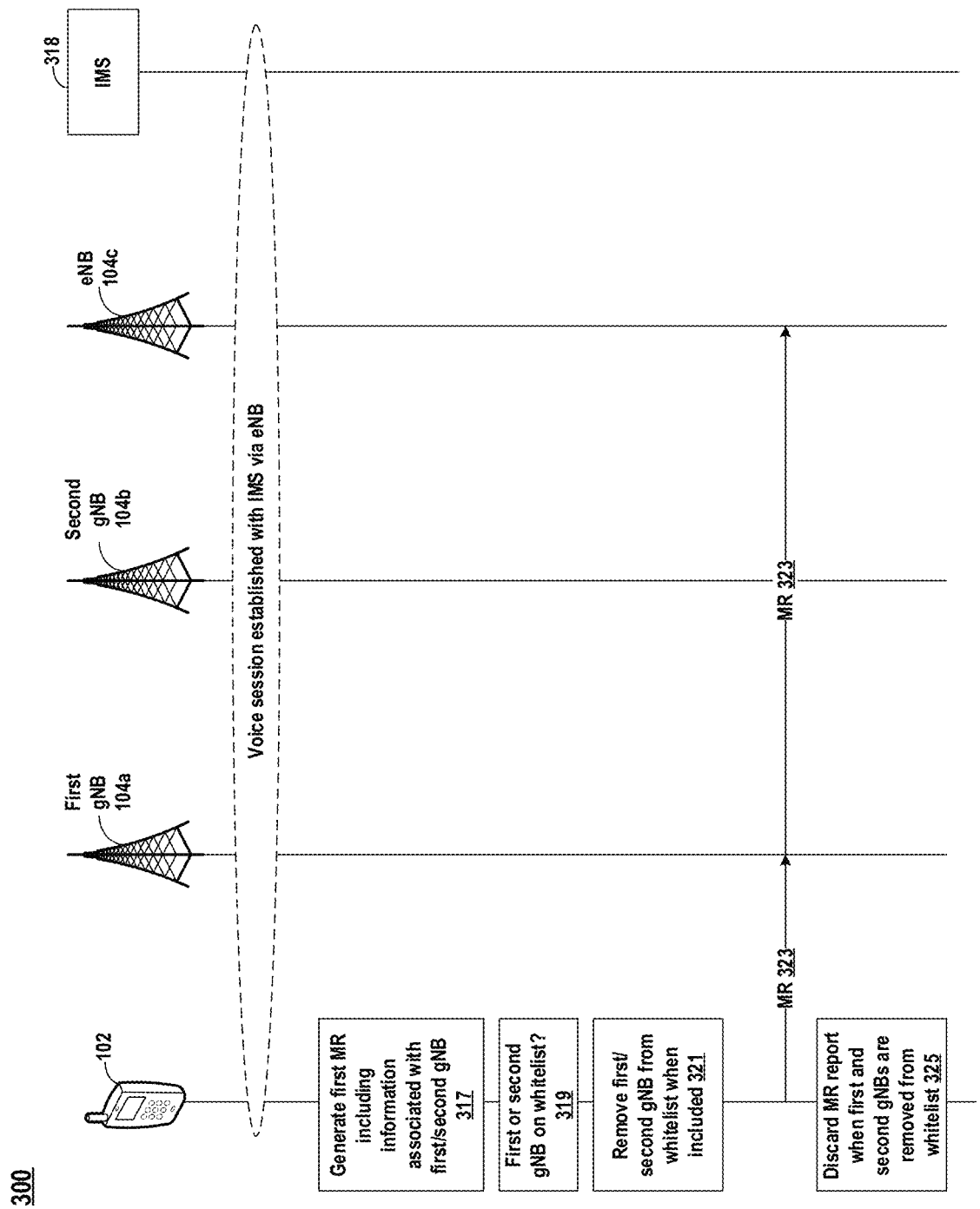

Turning to FIG. 3C, the operations depicted in this illustration may be performed in response to an MR request received at UE 102 during an IMS voice session initiated/established using EPS fallback via eNB 104*c*. In the example illustrated in FIG. 3C, the IMS voice session was initiated from first gNB 104*a*. During the IMS voice session in which UE 102 communicates with IMS 318 via eNB 104*c*, UE 102 may generate (at 317) an MR indicating, among others, the channel conditions it measured for first gNB 104*a* and second gNB 104*b*. The generation of the MR may be triggered by, e.g., an event B1 or an event B2 triggering condition. Prior to sending the MR to eNB 104*c*, UE 102 may access the whitelist from VoNR whitelist module 216 and determine (at 319) whether any of the NR cells of the MR are on the whitelist. UE 102 may remove (at 321) any NR cell from the MR that is determined (at 319) to not be on the whitelist. Then, when UE 102 sends (at 323) the MR to eNB 104*c*, eNB 104*c* will not initiate handover/redirection back to first gNB 104*a*, second gNB 104*b*, or any other cell that does not support VoNR because of these NR cells. This is because the MR does not include information related to those NR cells, which may otherwise trigger a handover/redirection from eNB 104*c* to an NR cell and cause IMS voice session failure. In this way, the IMS voice session established using EPS fallback may proceed without interruption or failure. In instances when all cells are removed from the MR (namely, there is nothing in the MR), UE 102 may discard (at 325) the MR altogether and not send it to eNB 104*c*.

Figure 3D:
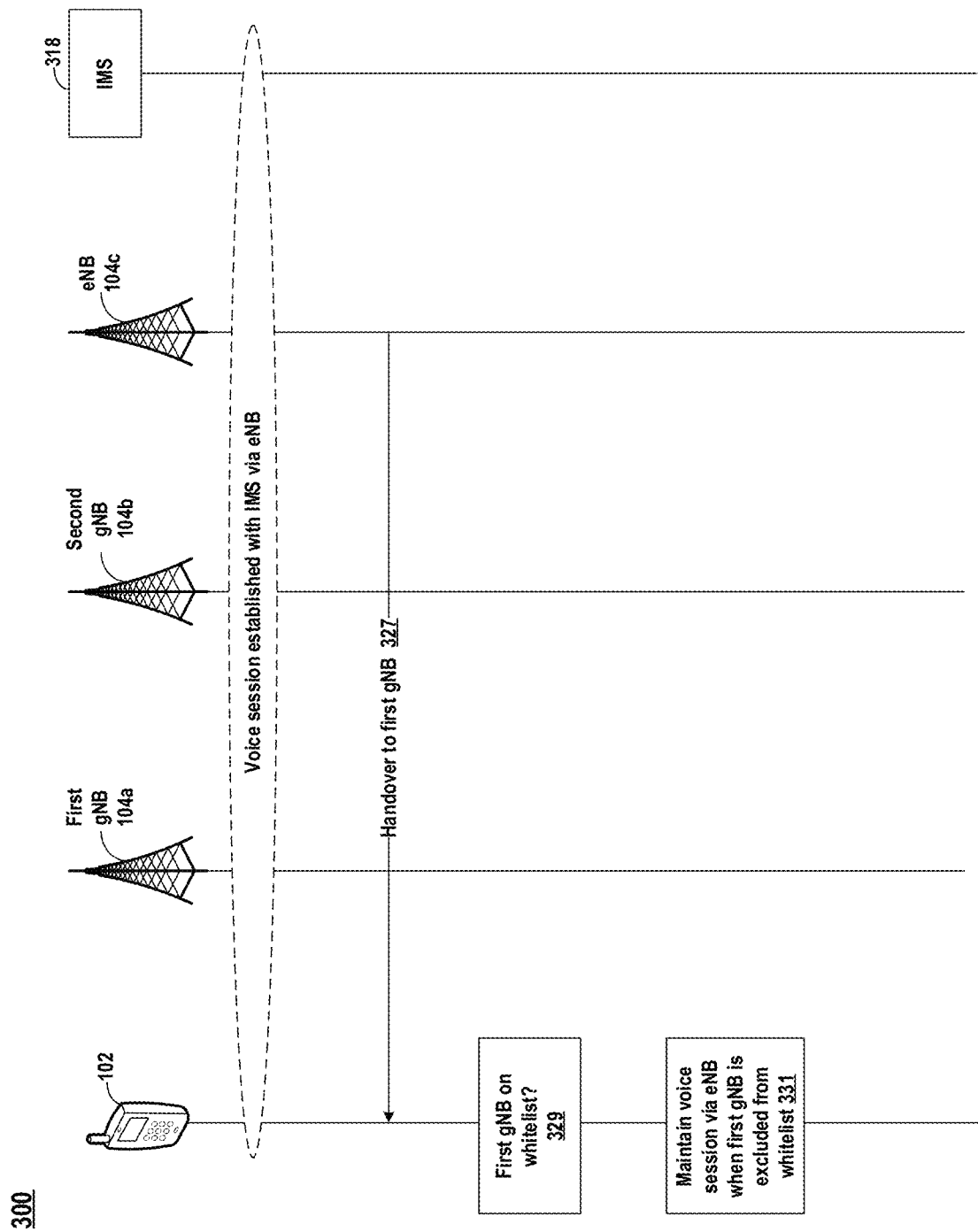

Referring to FIG. 3D, the operations depicted in this illustration may be performed in response to a request to handover from eNB 104*c* to first gNB 104*a* during an IMS voice session initiated/established using EPS fallback. For example, UE 102 may receive (at 327) a request to handover from eNB 104*c* to first gNB 104*a*. The handover request may be received directly from eNB 104*c*. By way of example, the handover request may be a blind handover request that is triggered at eNB 104*c* without measurement. In any case, UE 102 may determine (at 329) whether first gNB 104*a* is on the whitelist prior to performing handover. When it is determined (at 329) that first gNB 104*a* is not on the whitelist (meaning if handover to first gNB 104*a* were to occur, IMS voice session failure would also occur because VoNR is not supported at first gNB 104*a*), UE 102 may not perform handover to first gNB 104*a*. Instead, UE 102 maintains (at 331) the IMS voice session via eNB 104*c*. Otherwise, when it is determined (at 329) that first gNB 104*a* is on the whitelist (meaning if handover to first gNB 104*a* happens, IMS voice session failure will not occur because it can continue via VoNR at first gNB 104*a*), UE 102 may handover to first gNB 104*a*, and the IMS voice session can continue uninterrupted using VoNR.

Figure 3E:
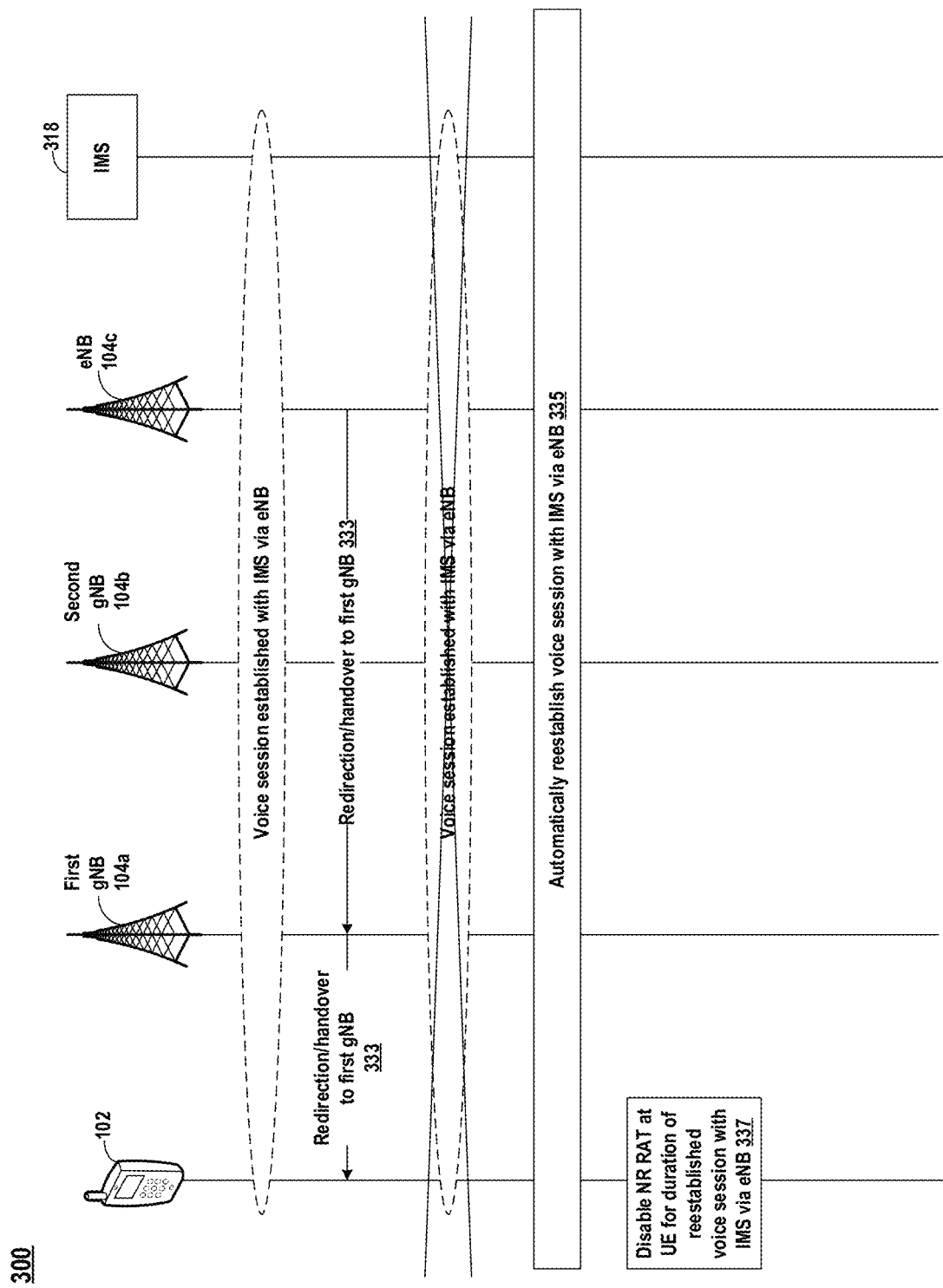

Referring to FIG. 3E, the operations depicted in this illustration may be performed after an IMS voice session initiated/established using EPS fallback via eNB 104*c* fails due to a handover to first gNB 104*a*, which in this use case does not support VoNR. UE 102 may perform handover in response to a handover request received (at 333) from eNB 104*c*, for example. Here, when IMS voice session failure occurs, UE 102 may automatically reestablish (at 335) the IMS voice session with eNB 104*c*. Either before or after the IMS voice session is reestablished, UE 102 may disable (at 337) its own NR RAT for the duration of the IMS voice session, such that any subsequent voice call will be initiated with eNB 104*c* and EPS fallback is no longer needed. By disabling the NR RAT, subsequent inter-RAT handover requests to NR will not occur for the duration of the disablement. In this way, the reestablished IMS voice session may proceed without interruption or failure due to inappropriate handover.

FIGS. 4A-4E illustrates a flowchart of an exemplary method 400 of wireless communication, according to embodiments of the disclosure. Exemplary method 400 may be performed by an apparatus for wireless communication, e.g., such as user equipment 102, apparatus 200, baseband chip 202, and/or node 500. Method 400 may include steps 402-456 as described below. It is to be appreciated that some of the steps may be optional, and some of the steps may be performed simultaneously, or in a different order than shown in FIGS. 4A-4E.

Figure 4A:
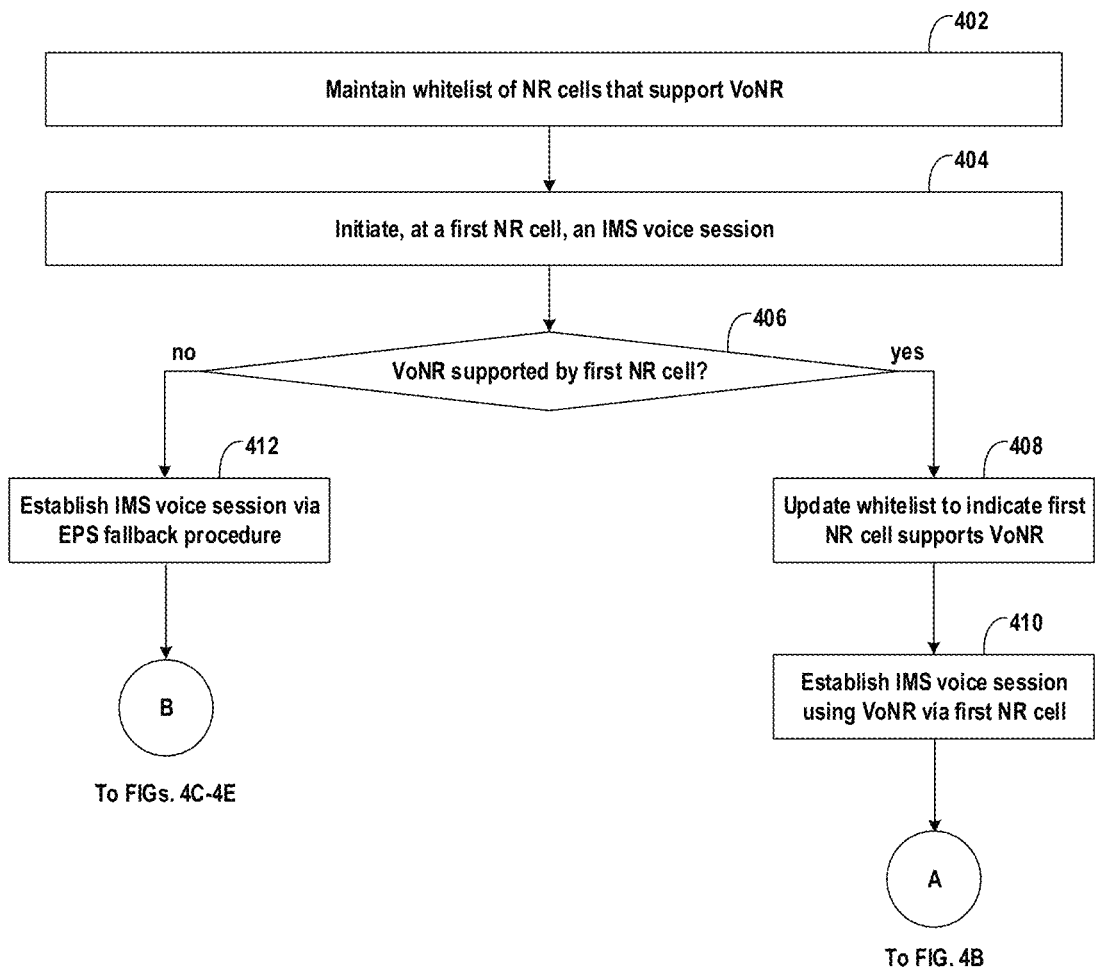
FIGS. 4A-4E illustrate a flow chart of an exemplary method of wireless communication, according to some embodiments of the present disclosure.

Referring to FIG. 4A, at 402, the apparatus may maintain a whitelist of NR cells that support VoNR. For example, referring to FIG. 2, baseband chip 202 may include VoNR whitelist module 216 configured to generate, maintain, and update a whitelist of NR cells that support VoNR. Each time apparatus 200 determines that an NR serving cell supports VoNR, the whitelist may be updated to include an indication of that NR cell. The whitelist may also be updated to indicate a number of IMS voice session failures at an NR serving cell that supports VoNR. In certain implementations, when the number of IMS voice session failures reaches a threshold number, apparatus 200 may remove that NR cell from the whitelist.

At 404, the apparatus may initiate, at a first NR cell, a voice session with an IMS. For example, referring to FIG. 3A, UE 102 may be camped on first gNB 104*a* and initiate (at 303) an IMS voice session. The IMS voice session initiated (at 303) may be initiated using, e.g., operations 601-607 described above in connection with FIG. 6.

At 406, the apparatus may determine whether the first NR cell supports VoNR when the voice session is initiated. For example, referring to FIG. 3A, based on whether redirection/handover instructions for EPS fallback are received after the initiation of the IMS voice session with first gNB 104*a*, UE 102 may determine (at 307) whether the first gNB 104*a* supports VoNR. When redirection/handover instructions are received, UE 102 may determine (at 307) that first gNB 104*a* does not support VoNR. Conversely, when redirection/handover instructions are not received, UE 102 may determine (at 307) that first gNB 104*a* supports VoNR.

When it is determined (at 406) that the first NR cell supports VoNR, the operations may continue at 408. At 408, the apparatus may update a whitelist of NR cells that support VoNR to include the first NR cell when it is determined that the first NR cell supports VoNR. For example, referring to FIG. 2, apparatus 200 may access the whitelist maintained by VoNR whitelist module 216 and update the whitelist to include an indication that first gNB 104*a* supports VoNR.

At 410, the apparatus may establish the voice session with the IMS using VoNR when it is determined that VoNR is supported by the first NR cell. For example, referring to FIG. 3A, when first gNB 104*a* supports VoNR, a voice session with IMS 318 may be established (at 309*b*) using VoNR via first gNB 104*a*.

Figure 4B:
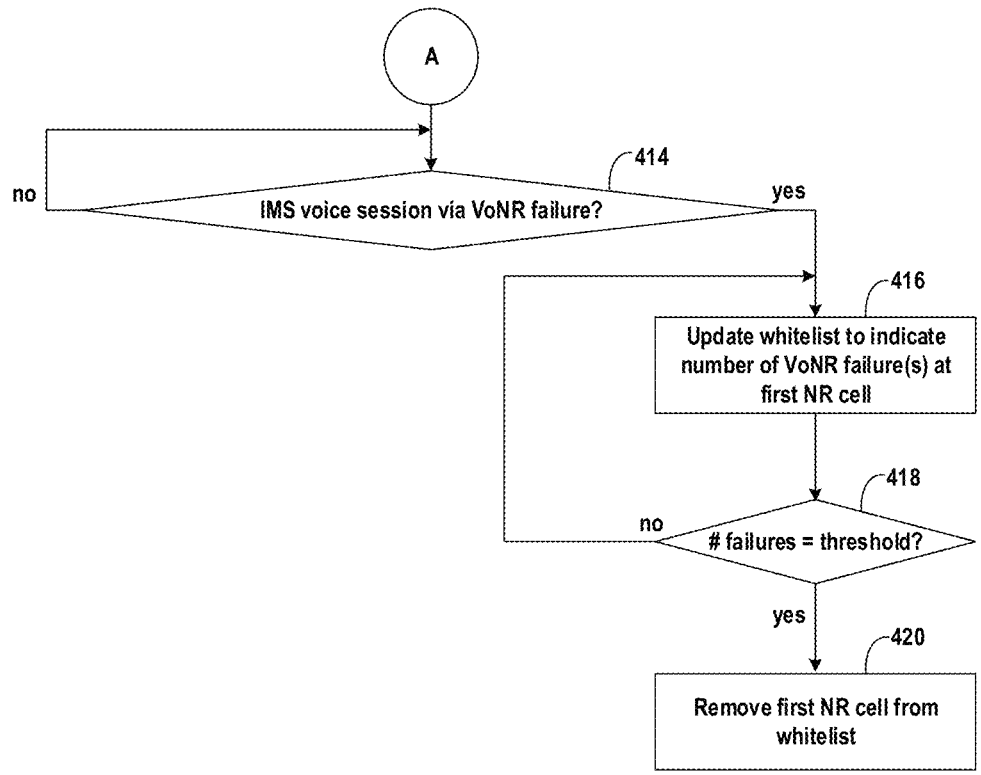

Referring to FIG. 4B, at 414, the apparatus may determine whether the voice session with the IMS established using VoNR fails at the first NR cell. For example, referring to FIG. 3B, UE 102 may determine when an IMS voice session (either initiating or established/ongoing using VoNR via the first gNB 104*a* fails.

At 416, the apparatus may update the whitelist to indicate a number of VoNR session failures associated with the first NR cell. For example, referring to FIG. 3B, when UE 102 determines an IMS voice session initiating/established using VoNR at first gNB 104*a* is dropped, UE 102 may update (at 311) the whitelist to indicate VoNR call failure at first gNB 104*a*. For example, UE 102 may update (at 311) the whitelist maintained at VoNR whitelist module 216 of baseband chip 202 by incrementing a counter associated with VoNR call failure at first gNB 104*a*.

At 418, the apparatus may determine whether the number of VoNR session failures associated with the first NR cell and indicated by the whitelist meets a threshold. For example, referring to FIG. 3B, once the whitelist has been updated, UE 102 may determine (at 313) whether the number of IMS voice sessions established using VoNR at first gNB 104*a* meets a threshold number of failures.

At 420, the apparatus may remove the first NR cell from the whitelist when it is determined that the number of VoNR session failures associated with the first NR cell meets the threshold. For example, referring to FIG. 3B, when it is determined (at 313) that the number of VoNR voice session failures meets the threshold number of failures, UE 102 may remove (at 315) first gNB 104*a* from the whitelist.

Referring again to FIG. 4A, when it is determined (at 406) that the first NR cell does not support VoNR, the operations may continue at 412. At 412, the apparatus may perform an EPS fallback procedure to establish the voice session with the IMS when it is determined that VoNR is not supported by the first NR cell. For example, referring to FIG. 3A, UE 102 may perform (at 309*a*) EPS fallback to establish a voice session with IMS 318 via eNB 104*c*. For example, the EPS fallback procedure performed (at 309*a*) by UE 102 may include, e.g., operations 609-615 described above in connection with FIG. 6.

Figure 4C:
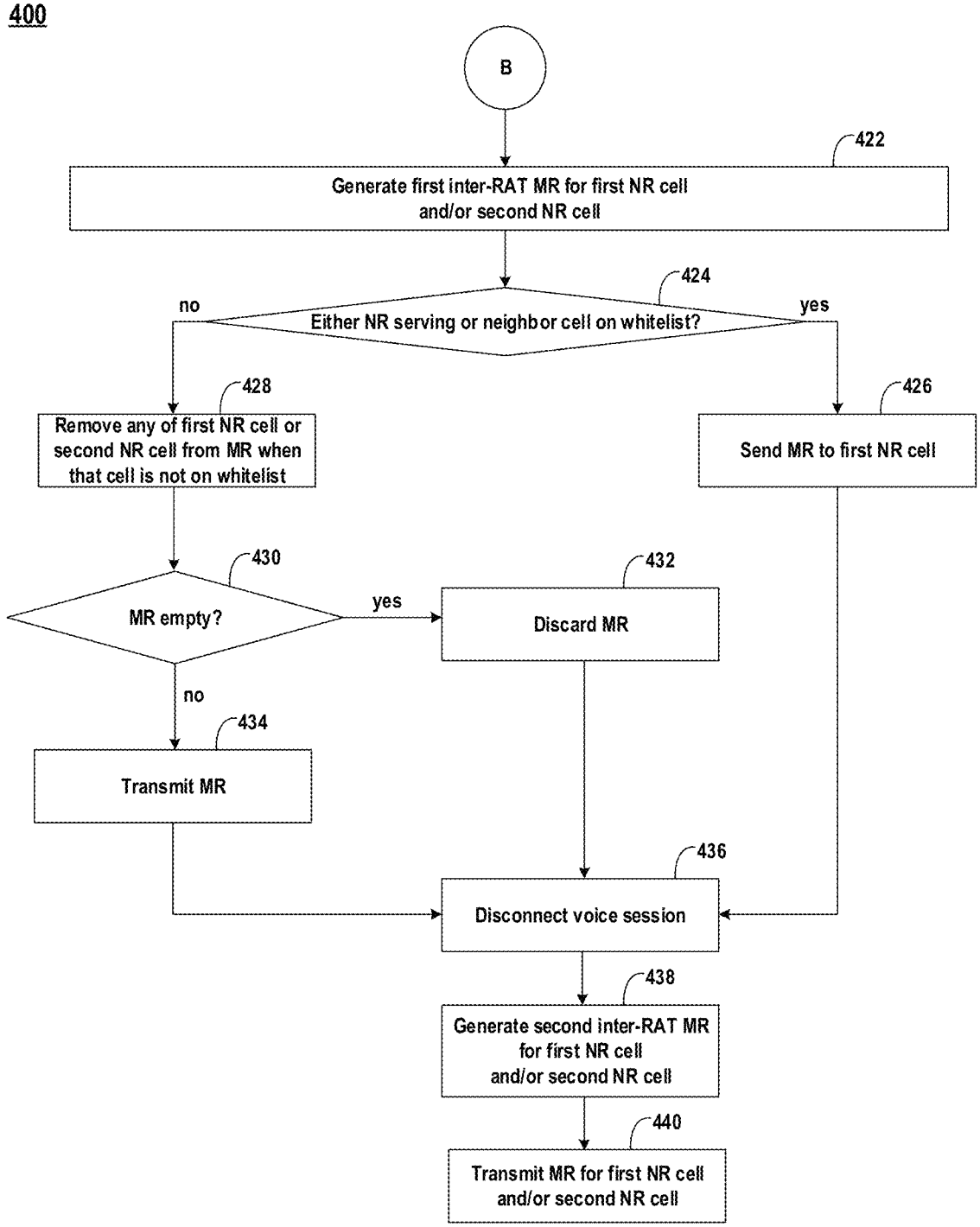

Referring to FIG. 4C, at 422, the apparatus may generate a first inter-RAT measurement report including information associated with the first NR cell and/or the second NR cell when at least one channel condition is met. For example, referring to FIG. 3C, during the IMS voice session in which UE 102 communicates with IMS 318 via eNB 104*c*, UE 102 may generate (at 317) an MR indicating, among others, the channel conditions (e.g., reference signal received power (RSRP), reference signal received quality (RSRQ), signal-to-noise and interference ratio (SINR), etc.) measured for first gNB 104*a* and second gNB 104*b*. The first inter-RAT measurement report may be associated with an event 'B1' or event 'B2' triggering condition. Event 'B1' may occur when a channel condition associated with second gNB 104*b* becomes higher than a threshold. Event 'B2' may occur when channel condition(s) at first gNB 104*a* meet or drop below a first threshold and when the signal condition(s) at second gNB 104*b* meet or exceed a second threshold.

At 424, the apparatus may determine whether the first NR cell and/or the second NR cell is included in the whitelist before transmitting the first inter-RAT measurement report. For example, referring to FIG. 3C, Prior to sending the MR to eNB 104*c*, UE 102 may access the whitelist from VoNR whitelist module 216 and determine (at 319) whether any of the cells of the MR are on the whitelist.

When it is determined (at 424) that both the first NR cell and/or the second NR cell are on the whitelist, the operation may move to 426. At 426, the apparatus may send the MR including information associated with both the first NR cell and the second NR cell to the eNB. For example, referring to FIG. 3C, when UE 102 sends (at 323) the MR to eNB 104*c*, eNB 104*c* may initiate handover/redirection to first gNB 104*a* or second gNB 104*b* since they both supports VoNR, which may have better conditions than the LTE serving cell.

Otherwise, when it is determined (at 424) that one or more of the first NR cell and/or the second NR cell are not on the whitelist, the operation may move to 428. At 428, the apparatus may remove any NR cell from the first inter-RAT measurement report that does not appear on the whitelist of NR cells that support VoNR. For example, referring to FIG. 3C, when it is determined (at 319) that one or more of the first gNB 104*a* and/or second gNB 104*b* are not on the whitelist, UE 102 may remove (at 321) any NR cell from the MR that is not on the whitelist.

At 430, the apparatus may determine whether the MR is empty because all NR cells have been removed for not supporting VoNR. For example, referring to FIG. 3C, before sending the MR (at 323), UE 102 may determine whether MR is empty due to the removal of NR cells that do not support VoNR.

When it is determined (at 430) that the MR is empty, the operation may move to 432. At 432, the apparatus may discard the empty MR. For example, referring to FIG. 3C, when all cells are removed from the MR (namely, there is nothing in the MR), UE 102 (at 325) may discard the MR altogether and not send to eNB 104*c*.

Otherwise, when it is determined (at 430) that the MR is not empty, the operation may move to 434. At 434, the apparatus may transmit the MR to the eNB. For example, referring to FIG. 3C, when UE 102 sends (at 323) the MR to eNB 104*c*, eNB 104*c* will not initiate handover/redirection back to first gNB 104*a*, second gNB 104*b*, or any other cell that does not support VoNR. This is because the MR does not include information related to those NR cells that would trigger a handover/redirection from eNB 104*c* to an NR cell that could cause IMS voice session failure.

At 436, the apparatus may disconnect the IMS voice session established using EPS fallback. Here, the disconnection of the IMS voice session is due to the user ending the call (or the user on the other UE ending the call) rather than IMS voice session failure. For example, referring to FIG. 3C, UE 102 may disconnect the IMS voice session after the MR is sent at 323.

At 438, the apparatus may generate, after the IMS voice session is disconnected, a second inter-RAT measurement report including information associated with the first NR cell when the at least one channel condition is met. In this use case, the first NR cell was not on the whitelist as determined at 424, and hence, the apparatus removed the first NR cell from the MR at 428. In other words, when the user ends the IMS voice session (by hanging up, for instance), the UE no longer removes NR cells that do not support VoNR from subsequent MRs (generated outside of an on-going IMS voice session) since the inclusion of such NR cells in the MR will no longer cause IMS voice session failure.

At 440, the apparatus may send the second inter-RAT measurement report to a base station. Here, the second inter-RAT measurement report may include measurement conditions associated with the NR serving cell. In other words, the operations of 436-440 indicate that NR cells are only removed from a requested MR during an IMS voice session established using EPS fallback to avoid call failure.

Figure 4D:
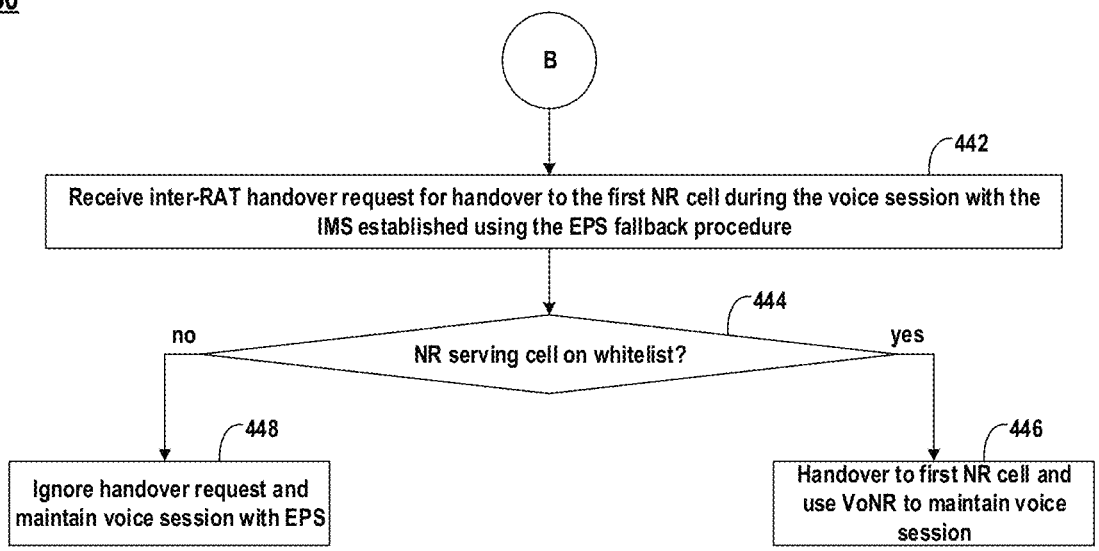

Referring to FIG. 4D, at 442, the apparatus may receive an inter-RAT handover request for handover to the first NR cell during the voice session with the IMS established using the EPS fallback procedure. The inter-RAT handover request may be a blind handover request based on load balancing at the eNB or other conditions that trigger such a blind request. A blind request being triggered by conditions other than those indicated by an MR. For example, referring to FIG. 3D, UE 102 may receive (at 327) a request to handover from eNB 104c to first gNB 104a. The handover request may be received directly from eNB 104c or through first gNB 104a. By way of example, the handover request may be a blind handover request that is triggered at eNB 104c due to overloading or changing channel conditions at that 4G cell.

At 444, the apparatus may determine whether the NR serving cell is on the whitelist when the inter-RAT handover request is received. For example, referring to FIG. 3D, UE 102 may determine (at 329) whether first gNB 104a is on the whitelist prior to performing handover.

When it is determined (at 444) that the NR serving cell is on the whitelist, the operations may move to 446. At 446, the apparatus may perform handover to the NR serving cell. For example, referring to FIG. 3D, when it is determined (at 329) that first gNB 104a is on the whitelist (meaning if handover to first gNB 104a happens, IMS voice session failure will not occur because it can continue via VoNR at first gNB 104a), UE 102 may handover to first gNB 104a, and the IMS voice session can continue uninterrupted using VoNR.

Otherwise, when it is determined (at 444) that the NR serving cell is not on the whitelist, the operations may move to 448. At 448, the apparatus may maintain the voice session with the IMS established using the EPS fallback procedure without handover to the NR serving cell when it is determined that the NR serving cell is excluded from the whitelist. For example, referring to FIG. 3D, when it is determined (at 329) that first gNB 104a is not on the whitelist (meaning if handover to first gNB 104a were to occur, IMS voice session failure would also occur because VoNR is not supported at first gNB 104a), UE 102 does not perform handover to first gNB 104a and maintains (at 331) the IMS voice session via eNB 104c.

Figure 4E:
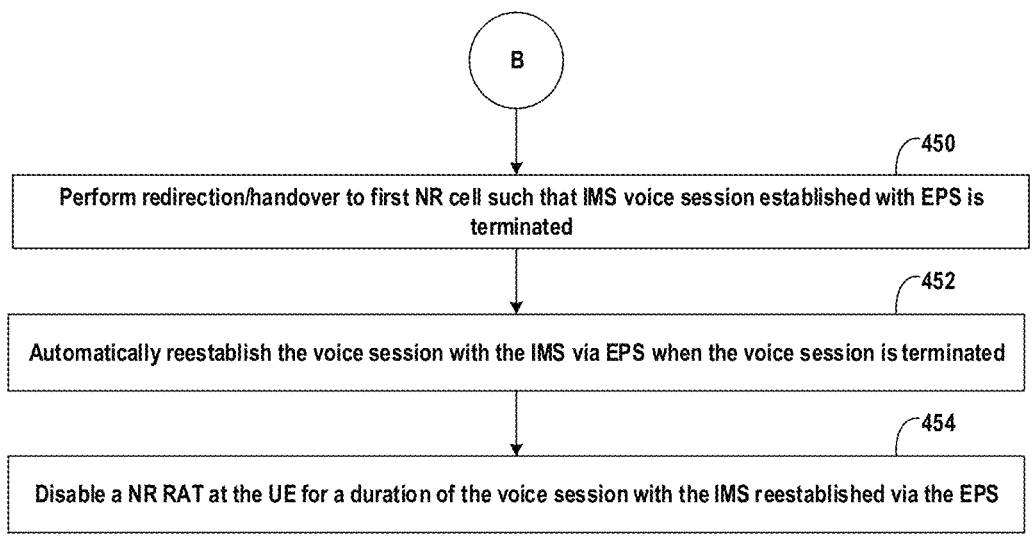

Referring to FIG. 4E, at 450, the apparatus may perform redirection to the NR serving cell such that the voice session with the IMS established using the EPS fallback procedure is terminated. For example, referring to FIG. 3E, UE 102 may receive a handover request (at 333), which causes an IMS voice session initiated/established using EPS fallback via eNB 104c fails because first gNB 104a that does not support VoNR.

At 452, the apparatus may automatically reestablish the voice session with the IMS via LTE when the voice session is terminated. For example, referring to FIG. 3E, when IMS voice session failure occurs, UE 102 may automatically reestablish (at 335) the IMS voice session with eNB 104c.

At 454, the apparatus may disable an NR RAT at the UE for a duration of the reestablished IMS voice session. For example, referring to FIG. 3E, either before or after the IMS voice session is reestablished, UE 102 may disable (at 337) its own NR RAT for the duration of the IMS voice session, such that any subsequent voice call will be initiated with eNB 104c and EPS fallback is no longer needed. By disabling the NR RAT, subsequent inter-RAT handover requests to NR will not occur for the duration of the disablement. In this way, the reestablished IMS voice session may proceed without interruption or failure due to inappropriate handover.

Using the various techniques described above in connection with FIGS. 1-5, the UE of the present disclosure may be prevented from redirection back to an NR cell that does not support VoNR, and thus, the failure of any initiated/ongoing IMS voice sessions established via EPS fallback may be avoided.

In various aspects of the present disclosure, the functions described herein may be implemented in hardware, software, firmware, or any combination thereof. If implemented in software, the functions may be stored on or encoded as instructions or code on a non-transitory computer-readable medium. Computer-readable media includes computer storage media. Storage media may be any available media that can be accessed by a computing device, such as node 500 in FIG. 5. By way of example, and not limitation, such computer-readable media can include RAM, ROM, EEPROM, CD-ROM or other optical disk storage, HDD, such as magnetic disk storage or other magnetic storage devices, Flash drive, SSD, or any other medium that can be used to carry or store desired program code in the form of instructions or data structures and that can be accessed by a processing system, such as a mobile device or a computer. Disk and disc, as used herein, includes CD, laser disc, optical disc, digital video disc (DVD), and floppy disk where disks usually reproduce data magnetically, while discs reproduce data optically with lasers. Combinations of the above should also be included within the scope of computer-readable media.

According to one aspect of the present disclosure, an apparatus for wireless communication of a UE is disclosed. The apparatus may include a memory and at least one processor coupled to the memory and configured to perform operations associated with wireless communication. For example, the at least one processor may be configured to initiate, at a first NR cell, a voice session with an IMS. The at least one processor may be further configured to determine whether the first NR cell supports VoNR when the voice session is initiated. The at least one processor may be further configured to perform an EPS fallback procedure to establish the voice session with the IMS when it is determined that VoNR is not supported by the first NR cell. The at least one processor may be further configured to update a whitelist of NR cells that support VoNR to include the first NR cell when it is determined that the first NR cell supports VoNR.

In some embodiments, the at least one processor may be further configured to establish the voice session with the IMS using VoNR when it is determined that VoNR is supported by the first NR cell.

In some embodiments, the at least one processor may be further configured to determine whether the voice session with the IMS established using VoNR fails at the first NR cell. In some embodiments, the at least one processor may be further configured to update the whitelist to indicate a number of VoNR session failures associated with the first NR cell.

In some embodiments, the at least one processor may be further configured to determine whether the number of VoNR session failures associated with the first NR cell and indicated by the whitelist meets a threshold. In some embodiments, the at least one processor may be further configured to remove the first NR cell from the whitelist when it is determined that the number of VoNR session failures associated with the first NR cell meets the threshold.

In some embodiments, the voice session may be established using the EPS fallback procedure. In some embodiments, the at least one processor may be further configured to generate a first inter-RAT measurement report including information associated with the first NR cell when at least one channel condition is met. In some embodiments, the at least one processor may be further configured to determine whether the first NR cell is included in the whitelist before transmitting the first inter-RAT measurement report. In some embodiments, the at least one processor may be further configured to remove the first NR cell from the first inter-RAT measurement report when it is determined that the first NR cell is excluded from the whitelist.

In some embodiments, the first inter-RAT measurement report may further include information associated with a second NR cell. In some embodiments, the at least one processor may be further configured to determine whether the second NR cell is included in the whitelist. In some embodiments, the at least one processor may be further configured to remove the second NR cell from the first inter-RAT measurement report when it is determined that the second NR cell is excluded from the whitelist. In some embodiments, the at least one processor may be further configured to discard the first inter-RAT measurement report when both the first NR cell and the second NR cell are removed from the measurement report.

In some embodiments, the first NR cell may not be included in the whitelist. In some embodiments, the at least one processor may be further configured to disconnect the voice session established using the EPS fallback procedure. In some embodiments, the at least one processor may be further configured to generate, after the voice session is disconnected, a second inter-RAT measurement report including information associated with the first NR cell when the at least one channel condition is met. In some embodiments, the at least one processor may be further configured to send the second inter-RAT measurement report to a base station. In some embodiments, the second inter-RAT measurement report may include measurement conditions associated with the first NR cell.

In some embodiments, the at least one processor may be further configured to receive an inter-RAT handover request for handover to the first NR cell during the voice session with the IMS established using the EPS fallback procedure. In some embodiments, the at least one processor may be further configured to determine whether the first NR cell is on the whitelist when the inter-RAT handover request is received. In some embodiments, the at least one processor may be further configured to maintain the voice session with the IMS established using the EPS fallback procedure without handover to the first NR cell when it is determined that the first NR cell is excluded from the whitelist.

According to one aspect of the present disclosure, an apparatus for wireless communication of a UE is disclosed. The apparatus may include a memory and at least one processor coupled to the memory and configured to perform operations associated with wireless communication. For example, the at least one processor may be configured to initiate, at an NR serving cell, a voice session with an IMS. The at least one processor may be further configured to determine whether the first NR cell supports VoNR when the voice session is initiated. The at least one processor may be further configured to establish the voice session with the IMS by performing an EPS fallback procedure when it is determined that VoNR is not supported by the first NR cell. The at least one processor may be further configured to perform redirection to the first NR cell such that the voice session with the IMS established using the EPS fallback procedure is terminated. The at least one processor may be further configured to automatically reestablish the voice session with the IMS via an EPS when the voice session is terminated.

In some embodiments, that at least one processor may be further configured to disable an NR RAT at the UE for a duration of the voice session with the IMS reestablished via the EPS.

According to one aspect of the present disclosure, a method of wireless communication of a UE is disclosed. The method may include initiating, at an NR serving cell, a voice session with an IMS. The method may further include determining whether the first NR cell supports VoNR when the voice session is initiated. The method may further include performing an EPS fallback procedure to establish the voice session with the IMS when it is determined that VoNR is not supported by the first NR cell. The method may further include updating a whitelist of NR cells that support VoNR to include the first NR cell when it is determined that the first NR cell supports VoNR.

In some embodiments, the method may further include establishing the voice session with the IMS using VoNR when it is determined that VoNR is supported by the first NR cell.

In some embodiments, the method may further include determining whether the voice session with the IMS established using VoNR fails at the first NR cell. In some embodiments, the method may further include updating the whitelist to indicate a number of VoNR session failures associated with the NR serving cell.

In some embodiments, the method may further include determining whether the number of VoNR session failures associated with the NR serving cell and indicated by the whitelist meets a threshold. In some embodiments, the method may further include removing the NR serving cell from the whitelist when it is determined that the number of VoNR session failures associated with the first NR cell meets the threshold.

In some embodiments, the voice session may be established using the EPS fallback procedure. In some embodiments, the method may further include generating a first inter-RAT measurement report including information associated with the first NR cell when at least channel one condition is met. In some embodiments, the method may further include determining whether the first NR cell is included in the whitelist before transmitting the first inter-RAT measurement report. In some embodiments, the method may further include removing the first NR cell from the first inter-RAT measurement report when it is determined that the first NR cell is excluded from the whitelist.

In some embodiments, the first inter-RAT measurement report further includes information associated with a second NR cell. In some embodiments, the method may further include determining whether the second NR cell is included in the whitelist. In some embodiments, the method may further include removing the second NR cell from the first inter-RAT measurement report when it is determined that the second NR cell is excluded from the whitelist. In some embodiments, the method may further include discarding the first inter-RAT measurement report when both the first NR cell and the second NR cell are removed from the measurement report.

In some embodiments, the first NR cell is not included in the whitelist. In some embodiments, the method may further include disconnecting the voice session established using the EPS fallback procedure. In some embodiments, the method may further include generating, after the voice session is disconnected, a second inter-RAT measurement report including information associated with the first NR cell when the at least one channel condition is met. In some embodiments, the method may further include sending the second inter-RAT measurement report to a base station. The second inter-RAT measurement report may include measurement conditions associated with the first NR cell.

In some embodiments, the method may further include receiving an inter-RAT handover request for handover to the NR target cell during the voice session with the IMS established using the EPS fallback procedure. In some embodiments, the method may further include determining whether the NR target cell is on the whitelist when the inter-RAT handover request is received. In some embodiments, the method may further include maintaining the voice session with the IMS established using the EPS fallback procedure without handover to the NR target cell when it is determined that the NR target cell is excluded from the whitelist.

According to another aspect of the present disclosure, a method of wireless communication of a UE is disclosed. The method may include initiating, at an NR serving cell, a voice session with an IMS. The method may further include determining whether the first NR cell supports VoNR when the voice session is initiated. The method may further include establishing the voice session with the IMS by performing an EPS fallback procedure when it is determined that VoNR is not supported by the first NR cell. The method may further include performing redirection to the first NR cell such that the voice session with the IMS established using the EPS fallback procedure is terminated. The method may further include automatically reestablishing the voice session with the IMS via EPS when the voice session is terminated.

In some embodiments, the method may further include disabling NR RAT at the UE for a duration of the voice session with the IMS reestablished via EPS.

According to another aspect of the present disclosure, a non-transitory computer-readable medium encoding instructions that, when executed by at least one processor, perform a process for voice communication of a UE. The process may include initiating, at an NR serving cell, a voice session with an IMS. The process may further include determining whether the first NR cell supports VoNR when the voice session is initiated. The process may further include performing an EPS fallback procedure to establish the voice session with the IMS when it is determined that VoNR is not supported by the first NR cell. The process may further include updating a whitelist of NR cells that support VoNR to include the first NR cell when it is determined that the first NR cell supports VoNR.

In some embodiments, the process may further include establishing the voice session with the IMS using VoNR when it is determined that VoNR is supported by the first NR cell.

In some embodiments, the process may further include determining whether the voice session with the IMS established using VoNR fails at the first NR cell. In some embodiments, the process may further include updating the whitelist to indicate a number of VoNR session failures associated with the first NR cell.

In some embodiments, the process may further include determining whether the number of VoNR session failures associated with the first NR cell and indicated by the whitelist meets a threshold. In some embodiments, the process may further include removing the first NR cell from the whitelist when it is determined that the number of VoNR session failures associated with the first NR cell meets the threshold.

In some embodiments, the voice session is established using the EPS fallback procedure. In some embodiments, the process may further include generating a first inter-RAT measurement report including information associated with the first NR cell when at least channel one condition is met. In some embodiments, the process may further include determining whether the first NR cell is included in the whitelist before transmitting the first inter-RAT measurement report. In some embodiments, the process may further include removing the first NR cell from the first inter-RAT measurement report when it is determined that the first NR cell is excluded from the whitelist.

In some embodiments, the first inter-RAT measurement report further includes information associated with a second NR cell. In some embodiments, the process may further include determining whether the second NR cell is included in the whitelist. In some embodiments, the process may further include removing the second NR cell from the first inter-RAT measurement report when it is determined that the second NR cell is excluded from the whitelist. In some embodiments, the process may further include discarding the first inter-RAT measurement report when both the first NR cell and the second NR cell are removed from the first inter-RAT measurement report.

In some embodiments, the first NR cell is not included in the whitelist. In some embodiments, the process may further include disconnecting the voice session established using the EPS fallback procedure. In some embodiments, the process may further include generating, after the voice session is disconnected, a second inter-RAT measurement report including information associated with the first NR cell when the at least one channel condition is met. In some embodiments, the process may further include sending the second inter-RAT measurement report to a base station. In some embodiments, the second inter-RAT measurement report may include measurement conditions associated with the first NR cell.

In some embodiments, the process may further include receiving an inter-RAT handover request for handover to the first NR cell during the voice session with the IMS established using the EPS fallback procedure. In some embodiments, the process may further include determining whether the first NR cell is on the whitelist when the inter-RAT handover request is received. In some embodiments, the process may further include maintaining the voice session with the IMS established using the EPS fallback procedure without handover to the first NR cell when it is determined that the first NR cell is excluded from the whitelist.

According to another aspect of the present disclosure, a non-transitory computer-readable medium encoding instructions that, when executed by at least one processor, perform a process for voice communication of a UE. The process may include initiating, at an NR serving cell, a voice session with an IMS. The process may further include determining whether the first NR cell supports VoNR when the voice session is initiated. The process may further include establishing the voice session with the IMS by performing an EPS fallback procedure when it is determined that VoNR is not supported by the first NR cell. The process may further include performing redirection to the first NR cell such that the voice session with the IMS established using the EPS fallback procedure is terminated. The process may further include automatically reestablishing the voice session with the IMS via EPS when the voice session is terminated.

In some embodiments, the process may further include disabling an NR RAT at the UE for a duration of time so the voice session with the IMS will be carried via EPS.

The foregoing description of the embodiments will so reveal the general nature of the present disclosure that others can, by applying knowledge within the skill of the art, readily modify and/or adapt for various applications such embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections may set forth one or more but not all exemplary embodiments of the present disclosure as contemplated by the inventor(s), and thus, are not intended to limit the present disclosure and the appended claims in any way.

Various functional blocks, modules, and steps are disclosed above. The arrangements provided are illustrative and without limitation. Accordingly, the functional blocks, modules, and steps may be reordered or combined in different ways than in the examples provided above. Likewise, some embodiments include only a subset of the functional blocks, modules, and steps, and any such subset is permitted.

The breadth and scope of the present disclosure should not be limited by any of the above-described exemplary embodiments, but should be defined only in accordance with the following claims and their equivalents.

What is claimed is:

1. An apparatus for wireless communication of a user equipment (UE), comprising:
   a memory; and
   at least one processor coupled to the memory and configured to:
      initiate, at a first new radio (NR) cell, a voice session with an internet protocol (IP) multimedia subsystem (IMS);
      perform, in response to determining that voice over NR (VoNR) is not supported by the first NR cell, an evolved packet system (EPS) fallback procedure to establish the voice session with the IMS; and
      update a whitelist of NR cells that support VONR to include the first NR cell when it is determined that the first NR cell supports VONR;
   in a case where the voice session with the IMS is established using the EPS fallback procedure when the first NR cell does not support VONR, the at least one processor is further configured to:
      generate, in response to a measurement report request, a first inter-radio access technology (RAT) measurement report including information associated with the first NR cell when at least one channel condition is met; and
      remove, in response to determining that the first NR cell is excluded from the whitelist, the first NR cell from the first inter-RAT measurement report.

2. The apparatus of claim 1, wherein the at least one processor is further configured to:
   establish the voice session with the IMS using VoNR when it is determined that VoNR is supported by the first NR cell.

3. The apparatus of claim 2, wherein the at least one processor is further configured to:
   update, in response to determining that the voice session with the IMS established using VoNR fails at the first NR cell, the whitelist to indicate a number of VoNR session failures associated with the first NR cell.

4. The apparatus of claim 3, wherein the at least one processor is further configured to:
   remove, in response to determining that the number of VoNR session failures associated with the first NR cell meets a threshold, the first NR cell from the whitelist.

5. The apparatus of claim 1, wherein:
   the first inter-RAT measurement report further includes information associated with a second NR cell, and
   the at least one processor is further configured to:
      remove, in response to determining that the second NR cell is excluded from the whitelist, the second NR cell from the first inter-RAT measurement report; and
      discard the first inter-RAT measurement report when both the first NR cell and the second NR cell are removed from the measurement report.

6. The apparatus of claim 1, wherein:
   when the first NR cell is not included in the whitelist, the at least one processor is further configured to:
      disconnect, in response to a user operation, the voice session with the IMS established using the EPS fallback procedure;
      generate, after the voice session with the IMS is disconnected, a second inter-RAT measurement report including information associated with the first NR cell when the at least one channel condition is met; and
      send the second inter-RAT measurement report to a base station, the second inter-RAT measurement report including measurement conditions associated with the first NR cell.

7. The apparatus of claim 1, wherein the at least one processor is further configured to:

receive an inter-RAT handover request for handover to the first NR cell during the voice session with the IMS established using the EPS fallback procedure; and maintain, in response to determining that the first NR cell is not on the whitelist when the inter-RAT handover request is received, the voice session with the IMS established using the EPS fallback procedure without handover to the first NR cell.

8. The apparatus of claim 7, wherein the at least one processor is further configured to:

continue the voice session with the IMS via VoNR with handover to the first NR cell when it is determined that the first NR cell is on the whitelist.

9. The apparatus of claim 1, wherein the at least one processor is further configured to:

after performing, in response to determining that VONR is not supported by the first NR cell, the EPS fallback procedure to establish the voice session with the IMS, perform redirection to the first NR cell; and in response to the voice session with the IMS established using the EPS fallback procedure being terminated due to the redirection, automatically reestablish the voice session with the IMS via an EPS.

10. The apparatus of claim 9, wherein the at least one processor is further configured to:

disable an NR RAT at the UE for a duration of the voice session with the IMS reestablished via the EPS.

11. The apparatus of claim 9, wherein the at least one processor is further configured to:

in response to the voice session with the IMS established using the EPS fallback procedure being terminated due to the redirection, automatically reestablish the voice session with the IMS via Long Term Evolution.

12. The apparatus of claim 7, wherein the inter-RAT handover request is a blind handover request triggered without measurement.

13. A method of wireless communication of a user equipment (UE), comprising:

initiating, at a new radio (NR) serving cell, a voice session with an internet protocol (IP) multimedia subsystem (IMS);

in response to determining that voice over NR (VoNR) is supported by the first NR cell, updating a whitelist of NR cells that support VONR to include the first NR cell, and establishing the voice session with the IMS using VONR;

updating, in response to determining that the voice session with the IMS established using VoNR fails at the first NR cell, the whitelist to indicate a number of VoNR session failures associated with the first NR cell; and removing, in response to determining that the number of VoNR session failures associated with the first NR cell meets a threshold, the first NR cell from the whitelist.

14. The method of claim 13, further comprising:

performing, in response to determining that VONR is not supported by the first NR cell, an evolved packet system (EPS) fallback procedure to establish the voice session with the IMS.

15. The method of claim 14, wherein:

in a case where the voice session with the IMS is established using the EPS fallback procedure, the method further comprises:

generating, in response to a measurement report request, a first inter-radio access technology (RAT) measurement report including information associated with the first NR cell when at least one channel condition is met; and in response to determining that the first NR cell is not included in the whitelist before transmitting the first inter-RAT measurement report, removing the first NR cell from the first inter-RAT measurement report.

16. The method of claim 14, further comprising:

receiving an inter-radio access technology (RAT) handover request for handover to the first NR cell during the voice session with the IMS established using the EPS fallback procedure;

in response to determining that the first NR cell is not on the whitelist when the inter-RAT handover request is received, maintaining the voice session with the IMS established using the EPS fallback procedure without handover to the first NR cell.

17. The method of claim 14, wherein after the EPS fallback procedure is performed to establish the voice session with the IMS in response to determining that VoNR is not supported by the first NR cell, the method further comprises:

performing redirection to the first NR cell;

in response to the voice session with the IMS established using the EPS fallback procedure being terminated due to the redirection, automatically reestablishing the voice session with the IMS via an EPS; and disabling an NR radio access technology (RAT) at the UE for a duration of the voice session with the IMS reestablished via the EPS.

18. A non-transitory computer-readable medium encoding instructions that, when executed by at least one processor, perform a process for voice communication of a user equipment (UE), the process comprising:

initiating, at a first new radio (NR) cell, a voice session with an internet protocol (IP) multimedia subsystem (IMS);

performing an evolved packet system (EPS) fallback procedure to establish the voice session with the IMS, in response to determining that the first NR cell does not support voice over NR (VONR); and updating a whitelist of NR cells that support VONR to include the first NR cell, in response to determining that the first NR cell supports VONR;

wherein after the EPS fallback procedure is performed to establish the voice session with the IMS in response to determining that the first NR cell does not support VONR, the process further comprises:

performing redirection to the first NR cell;

in response to the voice session with the IMS established using the EPS fallback procedure being terminated due to the redirection, automatically reestablishing the voice session with the IMS via an EPS; and disabling an NR radio access technology (RAT) at the UE for a duration of the voice session with the IMS reestablished via the EPS.

19. The non-transitory computer-readable medium of claim 18, wherein in a case where the voice session with the IMS is established using the EPS fallback procedure when the first NR cell does not support VONR, the process further comprises:

generating, in response to a measurement report request, a first inter-radio access technology (RAT) measurement report including information associated with the first NR cell when at least one channel condition is met; and removing, in response to determining that the first NR cell is excluded from the whitelist, the first NR cell from the first inter-RAT measurement report.

20. The non-transitory computer-readable medium of claim 18, wherein when it is determined that the first NR cell supports VONR, the process further comprises:
   establishing the voice session with the IMS using VoNR;
   updating, in response to determining that the voice session with the IMS established using VoNR fails at the first NR cell, the whitelist to indicate a number of VoNR session failures associated with the first NR cell; and
   removing, in response to determining that the number of VoNR session failures associated with the first NR cell meets a threshold, the first NR cell from the whitelist.

* * * * *